(12) United States Patent
Suzuki et al.

(10) Patent No.: US 11,179,662 B2
(45) Date of Patent: Nov. 23, 2021

(54) GAS-LIQUID SEPARATOR

(71) Applicant: USUI CO., LTD., Shizuoka (JP)

(72) Inventors: Tetsunobu Suzuki, Shizuoka (JP); Hidetaka Ito, Shizuoka (JP)

(73) Assignee: USUI CO., LTD, Shizuoka (JP)

( * ) Notice: Subject to any disclaimer, the term of this patent is extended or adjusted under 35 U.S.C. 154(b) by 241 days.

(21) Appl. No.: 16/463,997

(22) PCT Filed: Dec. 4, 2017

(86) PCT No.: PCT/JP2017/043506
§ 371 (c)(1),
(2) Date: May 24, 2019

(87) PCT Pub. No.: WO2018/105563
PCT Pub. Date: Jun. 14, 2018

(65) Prior Publication Data
US 2020/0386195 A1  Dec. 10, 2020

(30) Foreign Application Priority Data

Dec. 8, 2016 (JP) ............................ JP2016-238358

(51) Int. Cl.
*B01D 45/12* (2006.01)
*B04C 3/02* (2006.01)
(Continued)

(52) U.S. Cl.
CPC .............. *B01D 45/12* (2013.01); *B04C 3/02* (2013.01); *B04C 3/06* (2013.01); *B01D 45/08* (2013.01);
(Continued)

(58) Field of Classification Search
CPC ........ B01D 45/16; B01D 45/12; F02M 35/10; F02M 26/50; F02M 35/0223;
(Continued)

(56) References Cited

U.S. PATENT DOCUMENTS 1,735,298 A * 11/1929 Pfeffer ...................... B04C 3/04
55/343
2,245,536 A * 6/1941 Thurman ................ C11D 13/20
554/156

(Continued)

FOREIGN PATENT DOCUMENTS

CN 107076487 8/2017
CN 108697958 10/2018
(Continued)

OTHER PUBLICATIONS

Office Action [in English and Japanese] of Feb. 2, 2021 issued for corresponding application JP 2016-238358.
(Continued)

*Primary Examiner* — Dung H Bui
(74) *Attorney, Agent, or Firm* — Gottlieb, Rackman & Reisman, P.C.

(57) ABSTRACT

A gas-liquid separator includes an inlet pipe through which a gas-liquid two-phase fluid flows and a swirling flow generating ribbon disposed within the inlet pipe to swirl the gas-liquid two-phase fluid along an inner surface of the inlet pipe, wherein the inner surface of the inlet pipe includes a first step surface at a location downstream of a flow direction of the gas-liquid two-phase fluid from the swirling flow generating ribbon, the first step surface increasing an inner diameter of the inlet pipe downward thereof.

5 Claims, 17 Drawing Sheets

(51) Int. Cl.
*B04C 3/06* (2006.01)
*F02M 26/05* (2016.01)
*B01D 45/08* (2006.01)
*B04C 3/00* (2006.01)
*F02B 37/00* (2006.01)
*F02M 35/10* (2006.01)

(52) U.S. Cl.
CPC .. *B04C 2003/003* (2013.01); *B04C 2003/006* (2013.01); *F02B 37/00* (2013.01); *F02M 26/05* (2016.02); *F02M 35/10* (2013.01)

(58) Field of Classification Search
CPC ........ F02M 26/05; F02M 26/06; F02M 26/22; B04C 3/02; B04C 3/06; B04C 2003/006; Y02T 10/146
See application file for complete search history.

(56) References Cited

U.S. PATENT DOCUMENTS

| | | | | |
|---|---|---|---|---|
| 2,538,195 | A * | 1/1951 | Henkel | B01D 45/08 55/450 |
| 3,433,361 | A * | 3/1969 | Ades | B01D 21/26 210/258 |
| 3,517,821 | A * | 6/1970 | Keller | B04C 5/06 210/512.1 |
| 3,713,279 | A * | 1/1973 | Moore | B01D 45/16 55/319 |
| 3,813,854 | A * | 6/1974 | Hortman | B04C 3/00 55/399 |
| 3,885,934 | A | 5/1975 | Eads et al. | |
| 3,885,935 | A | 5/1975 | Nutter | |
| 4,008,059 | A * | 2/1977 | Monson | B01D 45/14 55/396 |
| 4,162,906 | A * | 7/1979 | Sullivan | B04C 3/04 55/346 |
| 4,180,391 | A * | 12/1979 | Perry, Jr. | B01D 45/16 55/324 |
| 4,187,089 | A * | 2/1980 | Hodgson | B01D 45/18 96/412 |
| 4,289,611 | A * | 9/1981 | Brockmann | B04C 3/04 209/710 |
| 4,311,494 | A * | 1/1982 | Conner | B01D 45/16 55/394 |
| 4,472,949 | A | 9/1984 | Fujisawa et al. | |
| 4,588,423 | A * | 5/1986 | Gillingham | B03C 3/12 96/43 |
| 4,976,748 | A * | 12/1990 | Prinsloo | B04C 3/06 95/269 |
| 5,294,410 | A * | 3/1994 | White | B01D 53/70 422/171 |
| 5,320,654 | A * | 6/1994 | Minami | B01D 45/04 55/347 |
| 5,403,367 | A * | 4/1995 | De Villiers | B01D 45/16 55/320 |
| 6,540,802 | B2 * | 4/2003 | Trautmann | F02M 35/10059 55/337 |
| 6,540,917 | B1 * | 4/2003 | Rachels | B04C 3/00 210/512.1 |
| 6,752,845 | B2 * | 6/2004 | Haland | B01D 45/16 55/340 |
| 6,958,107 | B1 * | 10/2005 | Clarke | B04C 3/06 159/2.1 |
| 7,743,742 | B2 * | 6/2010 | Wagner | F01M 13/04 123/41.86 |
| 7,835,483 | B2 * | 11/2010 | Chaki | B04C 3/00 376/370 |
| 8,043,394 | B2 * | 10/2011 | Mital | F01N 13/009 55/337 |
| 8,425,641 | B2 * | 4/2013 | Chaudhari | B04C 3/06 55/319 |
| 8,764,886 | B2 * | 7/2014 | Halpap | B04C 5/181 95/271 |
| 2002/0189995 | A1 * | 12/2002 | Bruckmann | B01D 45/12 210/512.1 |
| 2002/0194988 | A1 * | 12/2002 | Betting | B01D 45/16 95/29 |
| 2003/0115844 | A1 | 6/2003 | Sakakibara et al. | |
| 2005/0028499 | A1 * | 2/2005 | Greif | B04C 3/04 55/456 |
| 2005/0044825 | A1 | 3/2005 | Bazzarella | |
| 2005/0247619 | A1 | 11/2005 | Berger et al. | |
| 2005/0247691 | A1 | 11/2005 | Berger et al. | |
| 2005/0252837 | A1 * | 11/2005 | Haland | B01D 19/0063 210/97 |
| 2010/0147021 | A1 * | 6/2010 | Betting | B04C 3/00 62/533 |
| 2011/0048696 | A1 * | 3/2011 | Holte | E21B 43/124 166/105.5 |
| 2014/0116255 | A1 * | 5/2014 | Perez Guerra | B01D 45/12 96/216 |
| 2014/0130467 | A1 * | 5/2014 | Herman | B01D 46/125 55/414 |
| 2015/0290560 | A1 * | 10/2015 | Hoydal | B01D 19/0042 95/22 |
| 2015/0306528 | A1 * | 10/2015 | Mueller | B04C 3/06 55/338 |
| 2016/0096129 | A1 * | 4/2016 | Kochubei | F01M 11/08 95/269 |
| 2016/0177893 | A1 * | 6/2016 | Finn | F02M 35/024 95/23 |
| 2017/0276415 | A1 | 9/2017 | Ishiyama et al. | |
| 2017/0333918 | A1 * | 11/2017 | Hua | B01D 50/002 |
| 2018/0250620 | A1 * | 9/2018 | Vingelven | B01D 45/16 |
| 2018/0361290 | A1 | 12/2018 | Suzuki et al. | |
| 2018/0369731 | A1 * | 12/2018 | Mueller | B04C 3/06 |

FOREIGN PATENT DOCUMENTS

| | | |
|---|---|---|
| DE | 102004022312 | 9/2005 |
| EP | 1323478 | 7/2003 |
| EP | 3391952 | 10/2018 |
| JP | H0357393 | 8/1991 |
| JP | H07108998 | 4/1995 |
| JP | 09-220421 | 8/1997 |
| JP | 10-186079 | 7/1998 |
| JP | 11083151 A * | 3/1999 |
| JP | 2003190725 | 7/2003 |
| JP | 2005160187 | 6/2005 |
| JP | 2005-199160 | 7/2005 |
| JP | 2007-503296 | 2/2007 |
| JP | 2011-083702 | 2/2007 |
| JP | 2010-104906 | 5/2010 |
| WO | 2016063400 | 4/2017 |
| WO | 2017/104531 | 6/2017 |

OTHER PUBLICATIONS

International Search Report and Written Opinion, Japan Patent Office, Application No. PCT/JP2017/043506, dated Mar. 6, 2018.
European Extended Search Report, European Patent Office, Application No. 17877860.1, dated Jun. 2, 2020.

* cited by examiner

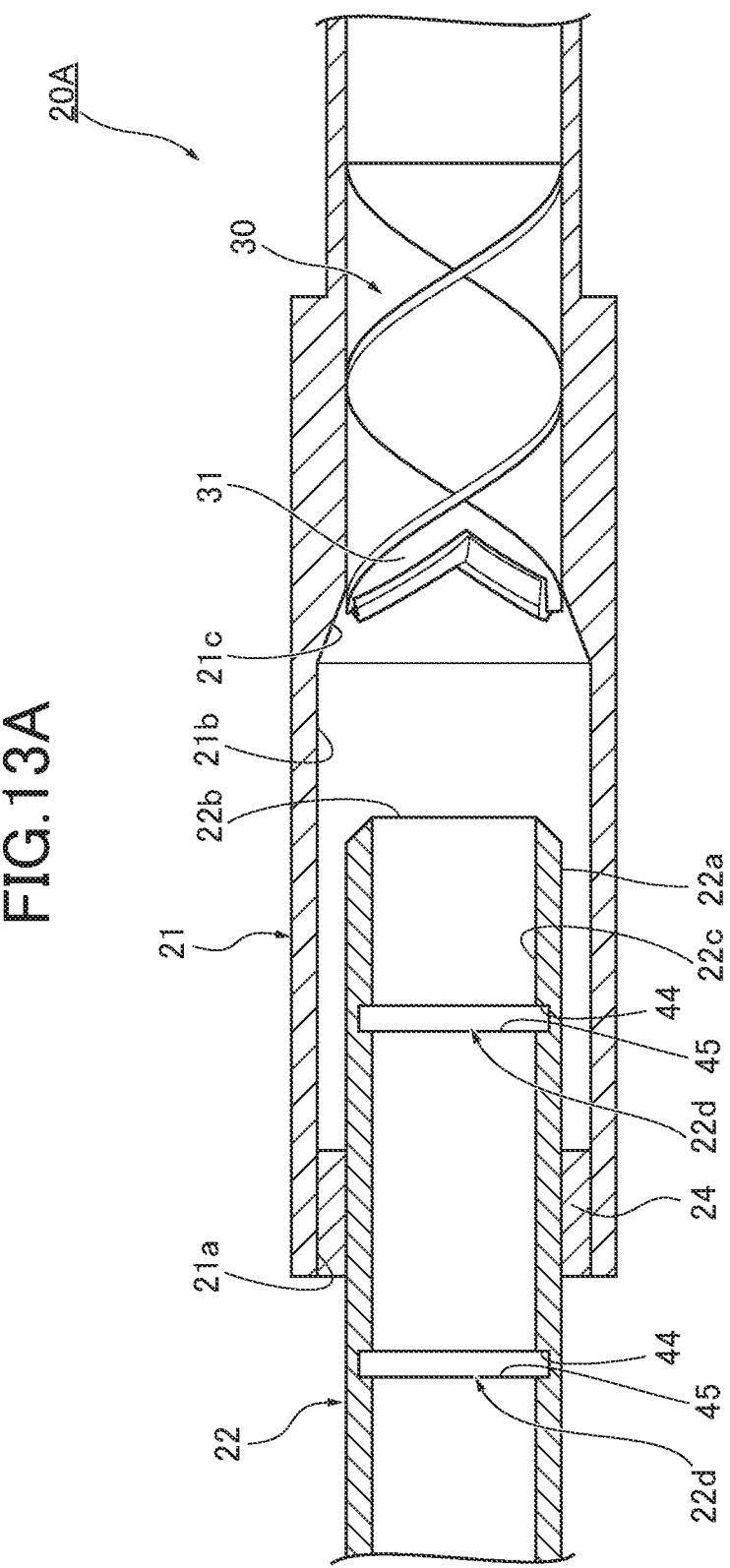

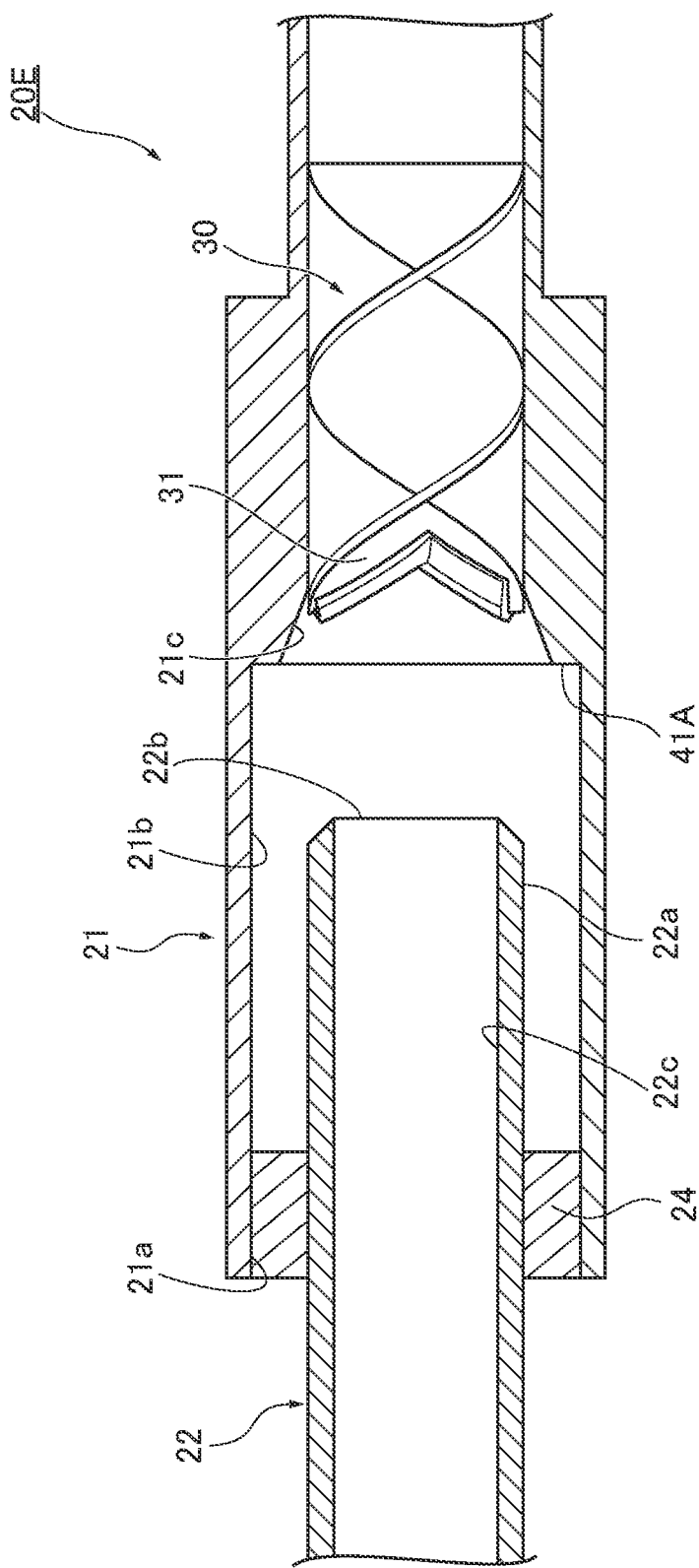

GAS-LIQUID SEPARATOR

CROSS-REFERENCE TO RELATED APPLICATION

This application is a U.S. National Phase of PCT Patent Application No. PCT/JP2017/043506 filed Dec. 4, 2017 which claims the benefit of priority from Japanese Patent Application No. 2016-238358 filed on Dec. 8, 2016, the entire disclosure of which is incorporated herein by reference.

TECHNICAL FIELD

The present disclosure relates to a gas-liquid separator that separates gas and liquid contained in gas-liquid two-phase fluid.

BACKGROUND ART

Conventionally, a gas-liquid separator that swirls gas-liquid two-phase fluid flowing through a pipe, guides liquid to an inner surface of the pipe by centrifugal force to form droplets, and separates the liquid turned to droplets from gas to be drained outside the pipe (see JP H09-220421A, JP 2003-190725A, JP 2005-160187A, for example).

SUMMARY

However, the conventional gas-liquid separator, which drains the liquid turned to droplets outside the pipe to be collected, requires a tank in which the liquid is retained and a new pipe that guides the liquid to the tank. As a result, the size of the gas-liquid separator increases. When the collection rate of the liquid is insufficient, the liquid turned to droplets may flow with gas, and the droplets may collide with a device (for example, internal combustion engine and turbine of turbo charger) disposed downstream of the gas-liquid separator to give an impact to the device.

The present disclosure has been made in view of the above problems, and an object of the present disclosure is to provide a gas-liquid separator capable of preventing the liquid turned to droplets from flowing with the gas when the gas and the liquid are separated by swirling the gas-liquid two-phase fluid while suppressing the increase in the size of the gas-liquid separator.

To achieve the above object, the present disclosure provides a gas-liquid separator including: a pipe through which a gas-liquid two-phase fluid flows; and a swirling flow generator disposed within the pipe to swirl the gas-liquid two-phase fluid along an inner surface of the pipe, wherein the inner surface of the pipe includes a first step surface at a location downstream of a flow direction of the gas-liquid two-phase fluid from the swirling flow generator, the first step surface increasing an inner dimeter of the pipe downward thereof.

BRIEF DESCRIPTION OF DRAWINGS

FIG. 13A is a cross sectional view illustrating a first variation of the gas-liquid separator according to the First Embodiment.

FIG. 14 is a cross sectional view illustrating a fifth variation of the gas-liquid separator according to the First Embodiment.

DESCRIPTION OF EMBODIMENTS

Hereinafter, preferred embodiments of a gas-liquid separator according to the present disclosure will be described in accordance with the First Embodiment and the Second Embodiment illustrated in the accompanying drawings.

First Embodiment

First, the configuration of a gas-liquid separator in the First Embodiment will be separately described under headings "Overall Configuration of System", "Detailed Configuration of Gas-Liquid Separator", and "Detailed Configuration of Swirling Flow Generating Ribbon".

(Overall Configuration of System)

Figure 1:
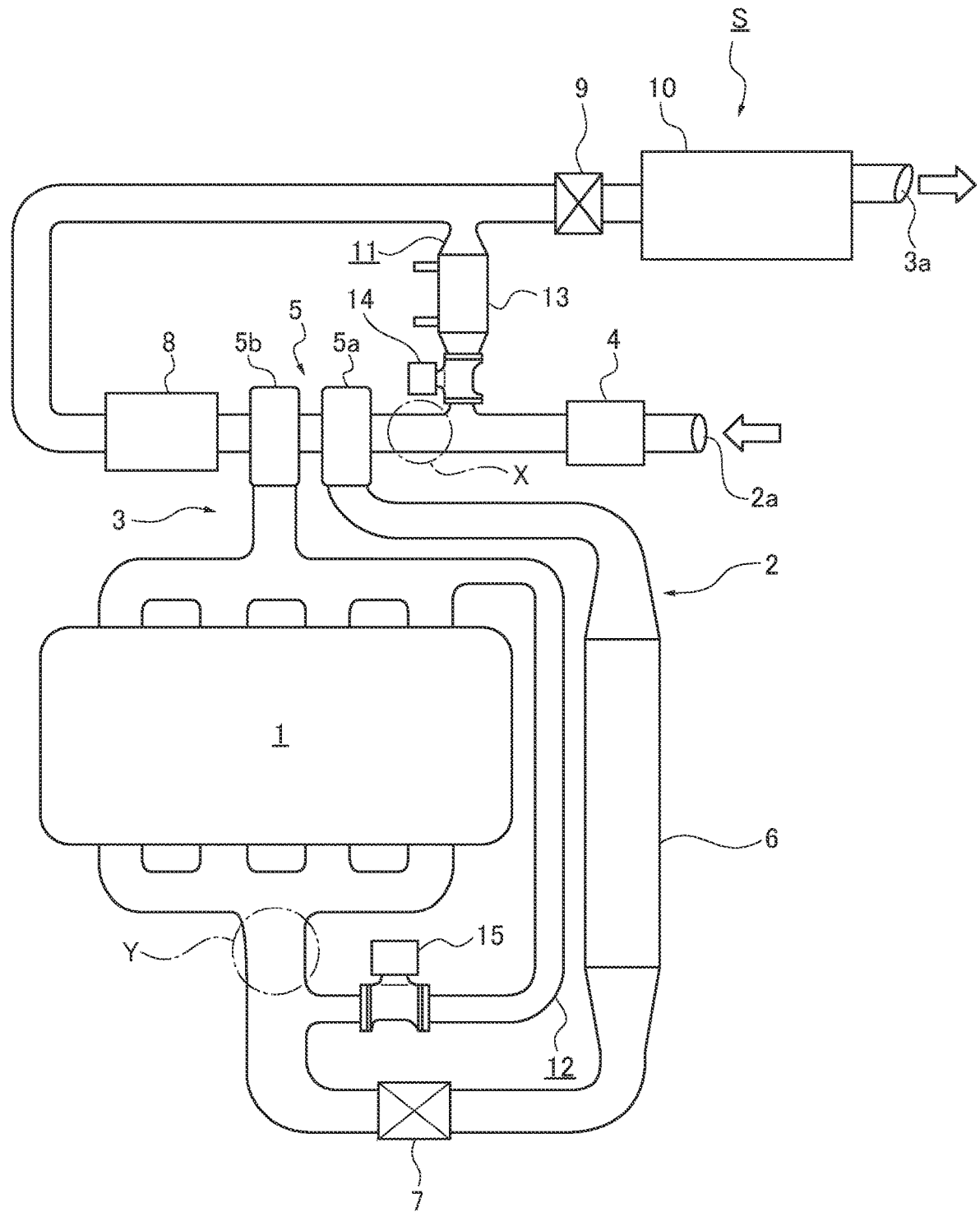
FIG. 1 is an entire system diagram illustrating an exhaust gas recirculation system of an internal combustion engine to which a gas-liquid separator according to a First Embodiment is applied.

FIG. 1 is an entire system diagram illustrating an exhaust gas recirculation system of an internal combustion engine to which a gas-liquid separator according to the First Embodiment is applied. Hereinafter, an overall configuration of the system in the First Embodiment will be described with reference to FIG. 1.

A gas-liquid separator 20 in the First Embodiment is applied to an exhaust gas recirculation system S of an internal combustion engine 1 shown in FIG. 1. Here, the internal combustion engine 1 shown in FIG. 1 is a diesel engine mounted in a vehicle as a driving source for traveling, and includes four cylinders (not shown). Each of the cylinders is connected to an intake passage 2 and an exhaust passage 3.

The intake passage 2 includes an intake port 2a at an end. In order from a side where the intake port 2a is disposed, the intake passage 2 is provided with an air cleaner 4 for filtering an intake air, a compressor 5a of a turbocharger 5, and an intercooler 6 for cooling the intake air, and a throttle valve 7 for regulating an amount of the intake air. In order from a side where the internal combustion engine 1 is disposed, the exhaust passage 3 is provided with a turbine 5b of the turbocharger 5, an exhaust purification catalyst 8 for purifying an exhaust gas, and an exhaust throttle valve 9 for regulating an amount of the exhaust gas. A muffler 10 is disposed downstream of the exhaust throttle valve 9, and an exhaust port 3a is disposed downstream of the muffler 10.

The intake passage 2 is connected to the exhaust passage 3 via a low-pressure EGR passage 11 and a high-pressure EGR passage 12. Here, "EGR (Exhaust Gas Recirculation)" is a technology for taking out a part of the exhaust gas after combustion in the internal combustion engine 1 and for taking in the gas again. "EGR" is also referred to as exhaust gas recirculation.

The low-pressure EGR passage 11 connects a portion of the intake passage 2 located upstream of the compressor 5a and a portion of the exhaust passage 3 located downstream of the exhaust purification catalyst 8. On the other hand, the high-pressure EGR passage 12 connects a portion of the intake passage 2 located downstream of the compressor 5a and a portion of the exhaust passage 3 located upstream of the turbine 5b. Thereby, the low-pressure EGR passage 11 returns the exhaust gas passing through the turbine 5b to the intake air before the compressor 5a. Further, the high-pressure EGR passage 12 returns the exhaust gas before flowing into the turbine 5b to the air passing through the compressor 5a.

The low-pressure EGR passage 11 is provided with an EGR cooler 13 for cooling the exhaust gas returning to the intake passage 2, and a low-pressure EGR valve 14 for regulating an amount of the exhaust air returning to the intake passage 2 via the low-pressure EGR passage 11. The high-pressure EGR passage 12 is provided with a high-pressure EGR valve 15 for regulating an amount of the exhaust air returning to the intake passage 2 via the high-pressure EGR passage 12.

The low-pressure EGR passage 11 can return the exhaust air without reducing an amount of the exhaust air passing through the turbine 5b of the turbocharger 5 and can effectively reduce NOx. However, the cooling in the EGR cooler 13 brings an issue of concern to generate condensed water. When the condensed water flows downstream in the form of droplets each having a certain size, the droplets may collide with the rotor blades and the like of the compressor 5a of the turbocharger 5 to give an impact to the rotor blades and the like. Therefore, in the First Embodiment, the gas-liquid separator 20 shown in FIG. 2 is provided downstream of the low-pressure EGR valve 14 and upstream of the compressor 5a of the turbocharger 5 (i.e. at a location surrounded by a dashed line X in FIG. 1) to vaporize the condensed water of the droplets.

(Detailed Configuration of Gas-Liquid Separator)

Figure 2:
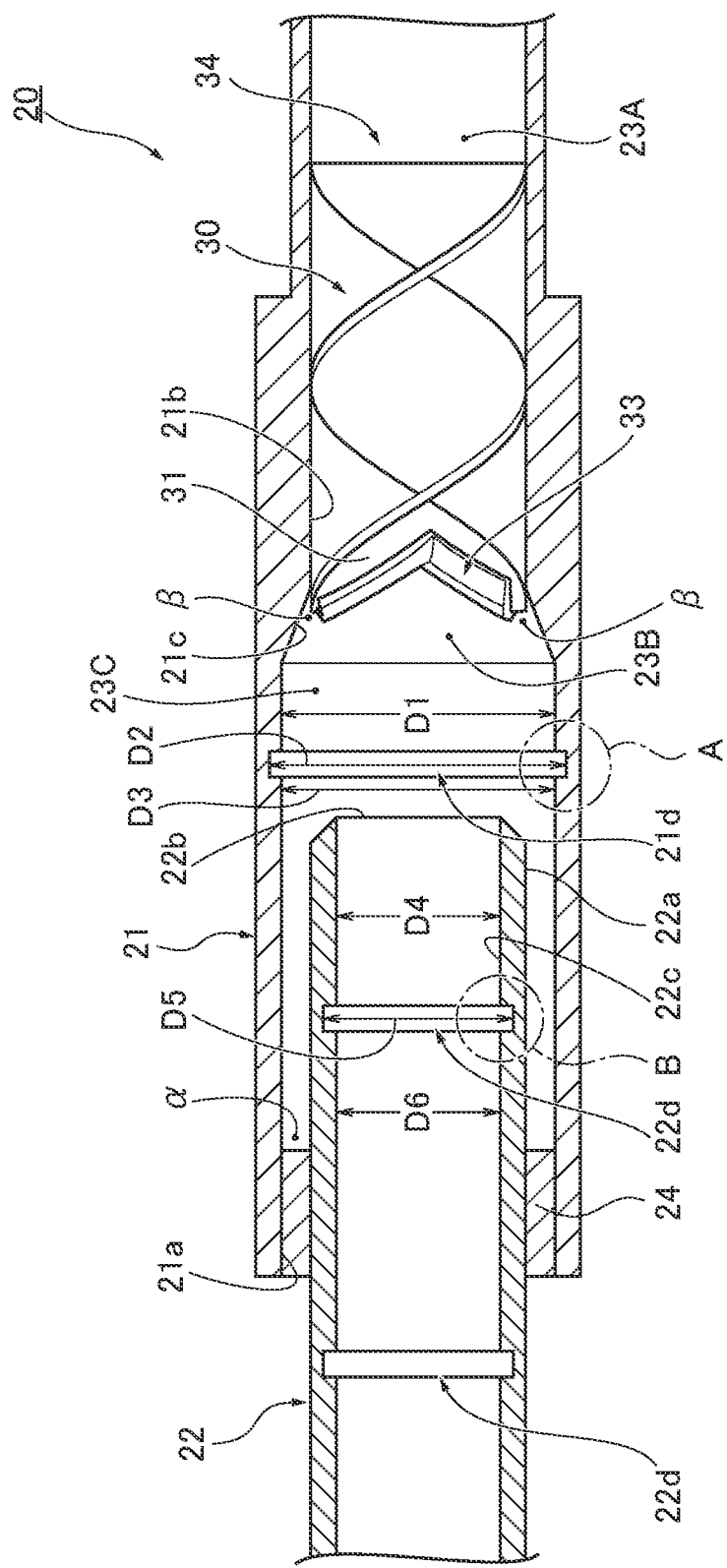
FIG. 2 is a cross sectional view illustrating the gas-liquid separator according to the First Embodiment.

FIG. 2 is a cross sectional view illustrating the gas-liquid separator according to the First Embodiment. Hereinafter, the configuration of the gas-liquid separator 20 in the First Embodiment will be described in detail with reference to FIG. 2.

As shown in FIG. 2, the gas-liquid separator 20 in the First Embodiment includes an inlet pipe 21, an inner pipe 22, and a swirling flow generating ribbon 30 (swirling flow generator).

The inlet pipe 21 includes an end which is located upstream (right side in FIG. 2) in a flow direction of the gas-liquid two-phase fluid. This upstream end of inlet pipe 21 is in connection with the intake port 2a and the low-pressure EGR valve 14. The inlet pipe 21 receives an exhaust gas in the mixture of a gas and particulate liquid (condensed water) (hereinafter, referred to as "a gas-liquid two-phase fluid"). The swirling flow generating ribbon 30 is disposed within the inlet pipe 21 to swirl the flow of the gas-liquid two-phase fluid along an inner surface 21b. Further, the inlet pipe 21 includes an exhaust port 21a at a downstream end (left side in FIG. 2) which is open in an axial direction. In order from the upstream side along the flow direction of the gas-liquid two-phase fluid, the inner surface 21b of the inlet pipe 21 is provided with a tapered surface 21c and a circular groove 21d.

The tapered surface 21c includes an inclined surface that gradually increases the inner diameter of the inlet pipe 21 toward the downstream of the flow direction of the gas-liquid two-phase fluid, and is formed at a location of the downstream of the flow direction of the gas-liquid two-phase fluid from the swirling flow generating ribbon 30. Accordingly, the inner diameter of the inlet pipe 21 is the smallest in a first area 23A upstream of the flow direction of the gas-liquid two-phase fluid from the tapered surface 21c, gradually increases in a second area 23B where the tapered surface 21c is formed, and is the largest in a third area 23C downstream of the flow direction of the gas-liquid two-phase fluid from the tapered surface 21c. The swirling flow generating ribbon 30 is disposed in the first area 23A and the exhaust port 21a is formed in the third area 23C.

Figure 3:
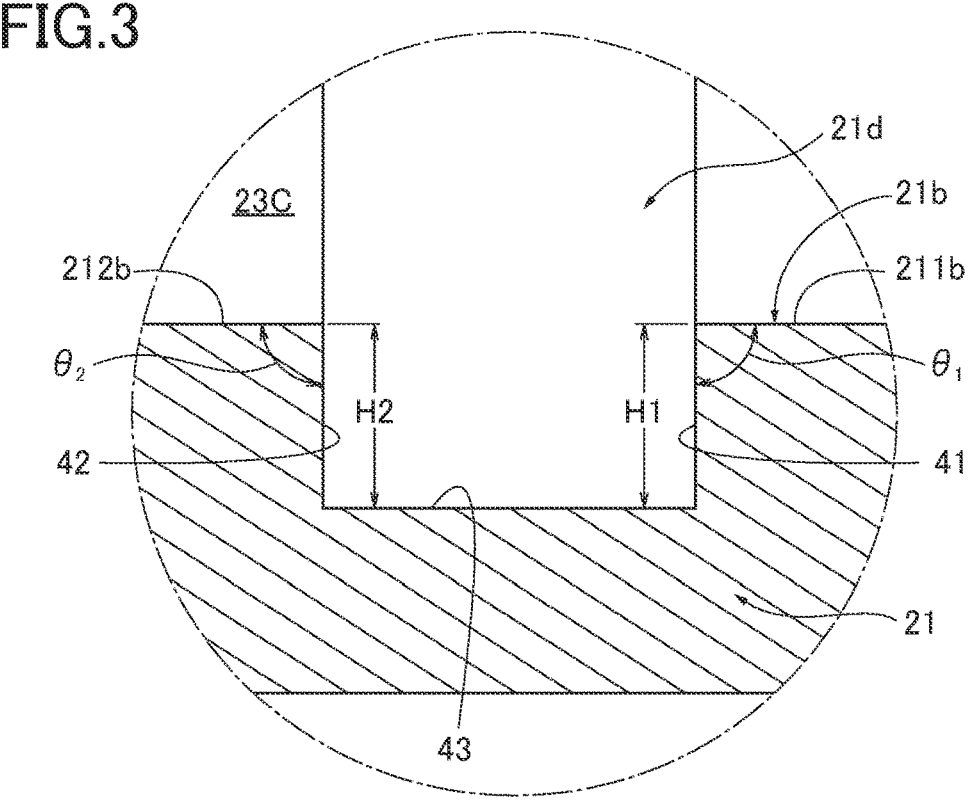
FIG. 3 is an enlarged view of an A portion illustrated in FIG. 2.

The circular groove 21d is a circular recess circumferentially extending along the inlet pipe 21, and is provided at a location of downstream from the tapered surface 21c, that is, the third area 23C. As shown in FIG. 3, the circular groove 21d includes a first step surface 41, a second step surface 42, and a bottom surface 43.

The first step surface 41 is a surface located upstream in the flow direction of the gas-liquid two-phase fluid among the surfaces defining the circular groove 21d. The first step surface 41 increases the inner diameter of the inlet pipe 21 in a step-wise manner toward downstream in the flow direction of the gas-liquid two-phase fluid. Specifically, an inner diameter D2 of the inlet pipe 21 defined within the circular groove 21d is larger than an inner diameter D1 of the inlet pipe 21 at a location upstream of the circular groove 21d. In this embodiment, an angle $\theta_1$ defined by the first step surface 41 and an inner surface 211b of the inlet pipe 21 located upstream of the first step surface 41 is set to 90° (degrees).

On the other hand, the second step surface 42 is a surface located downstream in the flow direction of the gas-liquid two-phase fluid among the surfaces defining the circular groove 21d. The second step surface 42 decreases the inner diameter of the inlet pipe 21 in the step-wise manner toward downstream in the flow direction of the gas-liquid two-phase fluid. Specifically, the inner diameter D2 of the inlet pipe 21 defined within the circular groove 21d is larger than an inner diameter D3 of the inlet pipe 21 at a location downstream of the circular groove 21d. In this embodiment, an angle $\theta_2$ defined by the second step surface 42 and an inner surface 212b of the inlet pipe 21 located downstream of the second step surface 42 is set to 90° (degrees). Further, a height H2 of the second step surface 42 has the same height as a height H1 of the first step surface 41.

The bottom surface 43 is a bottom surface of the circular groove 21d which circumferentially extends along the inlet pipe 21 and is located between the first step surface 41 and the second step surface 42.

The inner pipe 22 is a straight pipe which has an outer diameter smaller than the inner diameter of the inlet pipe 21 at the third area 23C. An end 22a of the inner pipe 22 is inserted into the exhaust port 21a of the inlet pipe 21 so that the inner pipe 22 is disposed coaxially with the inlet pipe 21. The end 22a includes an opening 22b which is open at a location downstream of the flow direction of the gas-liquid two-phase fluid from the swirling flow generating ribbon 30. Further, a downstream (left side in FIG. 2) end of the inner pipe 22 is in communication with the compressor 5a of the turbocharger 5. The opening 22b is open in an axial direction of the inner pipe 22. Specifically, the inlet pipe 21, the inner pipe 22, the exhaust port 21a, and the opening 22b are disposed coaxially with each other.

Figure 4:
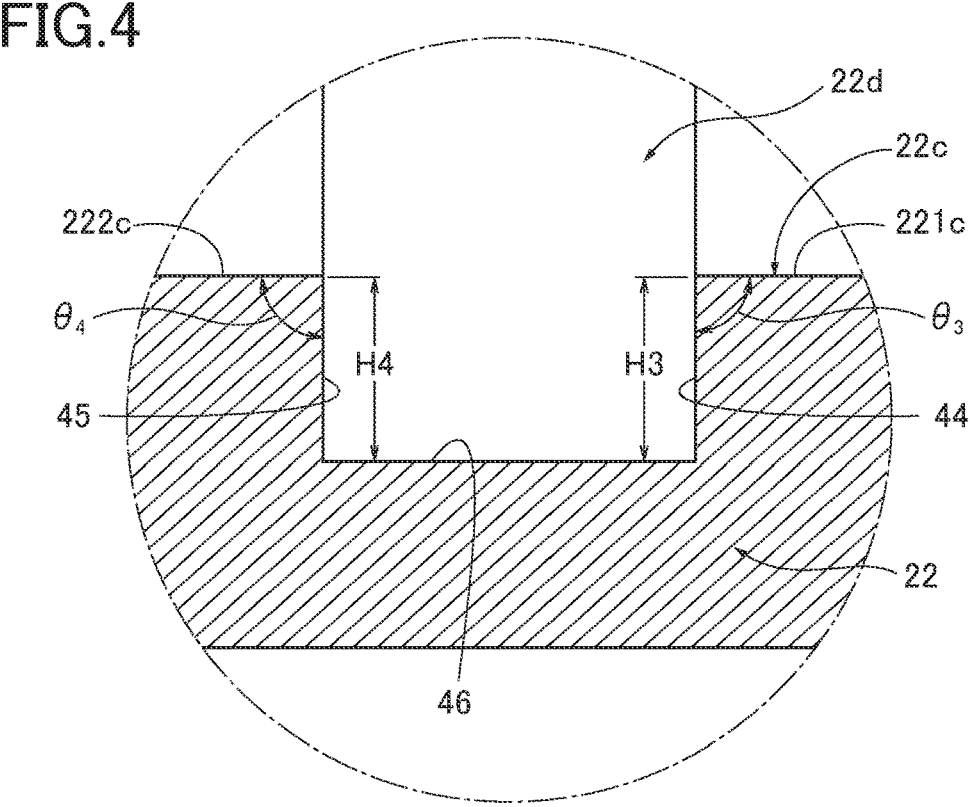
FIG. 4 is an enlarged view of a B portion illustrated in FIG. 2.

An inner surface 22c of the inner pipe 22 includes a plurality of circular grooves 22d (two grooves in this embodiment). Each of the circular grooves 22d is a circular recess formed in the inner pipe 22, that is, at a location downstream of the flow direction of the gas-liquid two-phase fluid from the swirling flow generating ribbon 30, and circumferentially extending along the inner pipe 22. In this embodiment, one of the two circular grooves 22d is formed in a portion inserted into the inlet pipe 21, and the other circular groove 22d is formed in a portion extending from the inlet pipe 21. As shown in FIG. 4, each circular groove 22d includes a first step surface 44, a second step surface 45, and a bottom surface 46.

The first step surface 44 is a surface located upstream in the flow direction of the gas-liquid two-phase fluid among the surfaces defining the circular groove 22d. The first step surface 44 increases the inner diameter of the inner pipe 22 in a step-wise manner toward downstream in the flow direction of the gas-liquid two-phase fluid. Specifically, an inner diameter D5 of the inner pipe 22 defined within the circular groove 22d is larger than an inner diameter D4 of the inner pipe 22 at a location upstream of the circular groove 22d. In this embodiment, an angle $\theta_3$ defined by the first step surface 44 and an inner surface 221c of the inner pipe 22 located upstream of the first step surface 44 is set to 90° (degrees).

On the other hand, the second step surface 45 is a surface located downstream in the flow direction of the gas-liquid two-phase fluid among the surfaces defining the circular groove 22d. The second step surface 45 decreases the inner diameter of the inner pipe 22 in the step-wise manner toward downstream in the flow direction of the gas-liquid two-phase fluid. Specifically, the inner diameter D5 of the inner pipe 22 defined within the circular groove 22d is larger than an inner diameter D6 of the inner pipe 22 at a location downstream of the circular groove 22d. In this embodiment, an angle $\theta_4$ defined by the second step surface 45 and an inner surface 222c of the inner pipe 22 located downstream of the second step surface 45 is set to 90° (degrees). Further, a height H4 of the second step surface 45 has the same height as a height H3 of the first step surface 44.

The bottom surface 46 is a bottom surface of the circular groove 22d which circumferentially extends along the inner pipe 22 and is located between the first step surface 44 and the second step surface 45.

The exhaust port 21a of the inlet pipe 21 is provided with a spacer 24 that fills a gap or clearance α between the inner surface 21b and the inner pipe 22. The spacer 24 has a cylindrical shape which is configured to surround the entire circumference of the inner pipe 22. An outer surface of the spacer 24 contacts the inner surface 21b of the inlet pipe 21 in an airtight state, and an inner surface of the spacer 24 contacts the outer surface of the inner pipe 22 in the airtight state.

Figure 5:
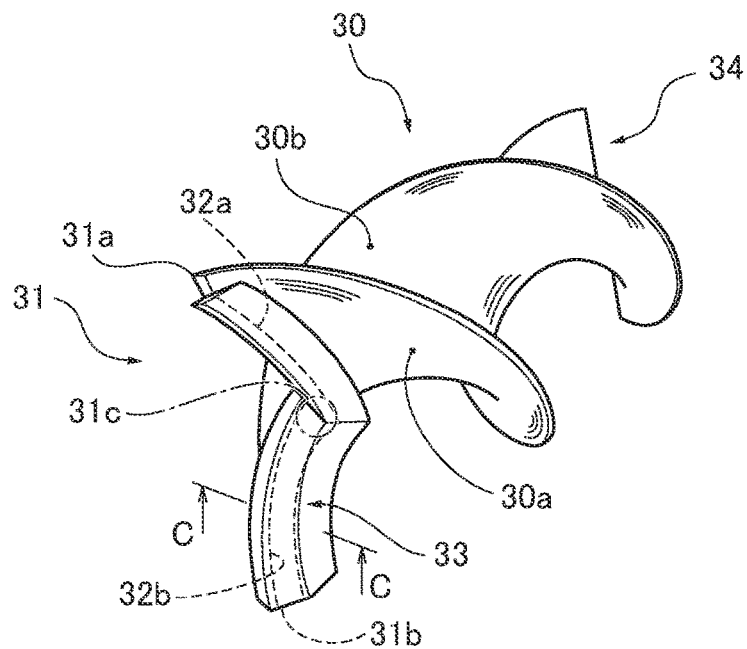
FIG. 5 is a perspective view illustrating a swirling flow generating ribbon according to the First Embodiment.
Figure 6:
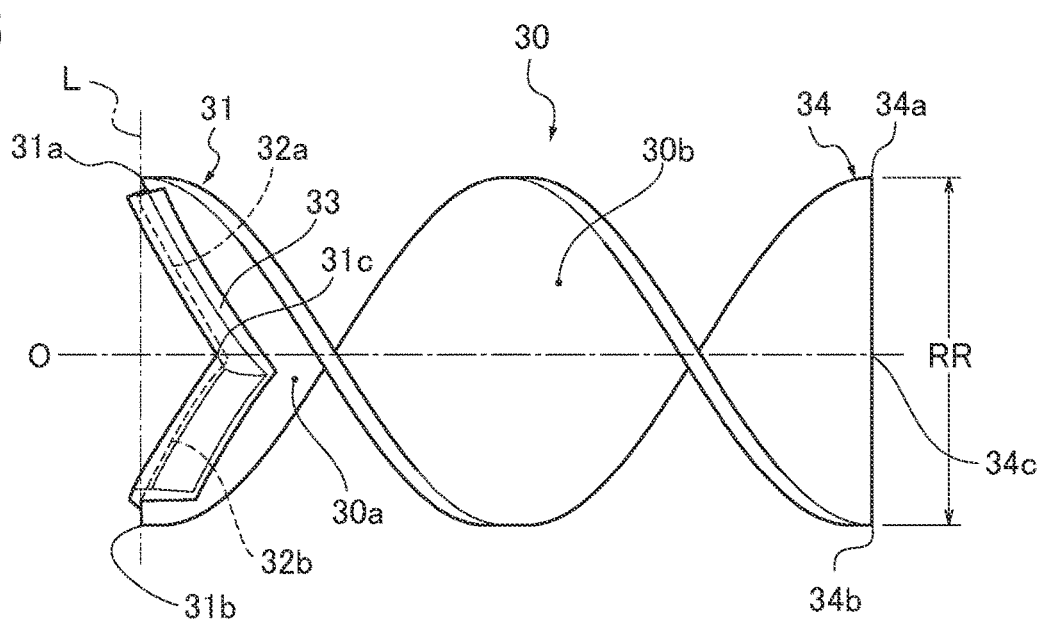
FIG. 6 is a side view illustrating the swirling flow generating ribbon according to the First Embodiment.
Figure 7:
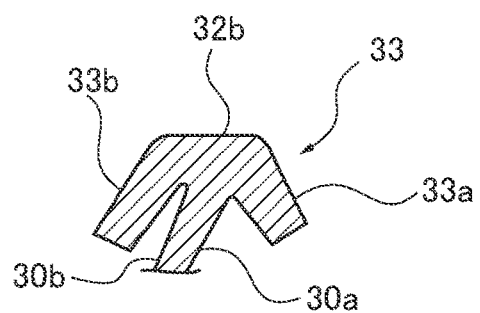
FIG. 7 is a cross sectional view along a line C-C shown in FIG. 5.

(Detailed Configuration of Swirling Flow Generating Ribbon) FIG. 5 is a perspective view illustrating the swirling flow generating ribbon according to the First Embodiment. FIG. 6 is a side view illustrating the swirling flow generating ribbon. FIG. 7 is a cross sectional view along a line C-C shown in FIG. 5. Hereinafter, the configuration of the swirling flow generating ribbon according to the First Embodiment will be described in detail with reference to FIG. 5 to FIG. 7.

The swirling flow generating ribbon 30 is formed by helically twisting a plate member in a band shape. The swirling flow generating ribbon 30 is disposed in the first area 23A of the inlet pipe 21. A radial dimension RR of the swirling flow generating ribbon 30 (see FIG. 6) is set to have the substantially same size as the inner diameter of the first area 23A. The swirling flow generating ribbon 30 is disposed coaxially with the inlet pipe 21, and a peripheral edge of the swirling flow generating ribbon 30 contacts the inner surface 21b of the inlet pipe 21.

The swirling flow generating ribbon 30 includes a terminal end 31 which is located in a side where the gas-liquid two-phase fluid flows out. At the terminal end 31, the swirling flow generating ribbon 30 includes a first terminal end point 31a, a second terminal end point 31b, a middle terminal end point 31c, a first terminal edge 32a, and a second terminal edge 32b. The first terminal end point 31a is located in one of radially outside terminal ends of the swirling flow generating ribbon 30. The second terminal end point 31b is located in the other of the radially outside terminal ends. The axial position of the first terminal end point 31a is coincident with that of the second terminal end point 31b. A terminal line L between the first terminal end point 31a and the second terminal end point 31b is perpendicular to an axial line O of the swirling flow generating ribbon 30. The middle terminal end point 31c is located on the axial line O of the swirling flow generating ribbon 30, and is in a position closer to a side where the gas-liquid two-phase fluid flows in than the first terminal end point 31a and the second terminal end point 31b.

The first terminal edge 32a of the swirling flow generating ribbon 30 connects the first terminal end point 31a and the middle terminal end point 31c. The second terminal edge 32b connects the second terminal end point 31b and the middle terminal end point 31c. Specifically, in the terminal end 31 of the swirling flow generating ribbon 30, a V shaped space or area is defined by the first terminal edge 32a, the second terminal edge 32b, and the terminal line L.

Further, each of the first terminal edge 32a and the second terminal edge 32b of the swirling flow generating ribbon 30 includes a folded back structure 33. The folded back structure 33 is configured to be folded back toward the side where the gas-liquid two-phase fluid flows in. As shown in FIG. 7, the folded back structure 33 includes a first folded back piece 33a and a second folded back piece 33b. The first folded back piece 33a is formed by folding back the tips of the first terminal edge 32a and the second terminal edge 32b toward a helical surface 30a of the swirling flow generating ribbon 30. The second folded back piece 33b is formed by folding back the tips of the first terminal edge 32a and the second terminal edge 32b toward the other helical surface 30b. The folded back structure 33 is formed between the middle terminal end point 31c and a position before the first terminal end point 31a, and between the middle terminal end point 31c and a position before the second terminal end point 31b. Thereby, a gap or clearance β is formed between both radial ends of the folded back structure 33 and the inner surface 21b of the inlet pipe 21 (see FIG. 2).

The swirling flow generating ribbon 30 is disposed in the first area 23A. However, at least the first terminal end point 31a and the second terminal end point 31b of the terminal end 31 are inserted into an area where the tapered surface 21c is formed on the inner surface 21b, that is, the second area 23B.

The swirling flow generating ribbon 30 includes a starting portion 34 which is located in the side of the swirling flow generating ribbon 30 where the gas-liquid two-phase fluid flows in. At the starting portion 34, the swirling flow generating ribbon 30 includes a first starting point 34a, a second starting point 34b, and a middle starting point 34c. The first starting point 34a is located in one of radially outside starting ends of the swirling flow generating ribbon 30. The second starting point 34b is located in the other of radially outside starting ends of the swirling flow generating ribbon 30. The middle starting point 34c is located on the axial line O of the swirling flow generating ribbon 30. The axial position of middle starting point 34c is coincident with the axial positions of the first starting point 34a and the second starting point 34b. Specifically, the middle starting point 34c is set on the intersection of the axial line O and a starting line which connects the first starting point 34a and the second starting point 34b. The first starting point 34a, the second starting point 34b, and the middle starting point 34c are aligned in the radial direction of the swirling flow generating ribbon 30. The starting portion 34 of the swirling flow generating ribbon 30 extends in the direction of gravity.

Next, the action of the gas-liquid separator in the First Embodiment will be separately described under the heading "Droplet Evaporation Action of First Step Surface", "Droplet Retention Action of Second Step Surface", and "Other Characteristic Action".

(Droplet Evaporation Action of First Step Surface)

Figure 8:
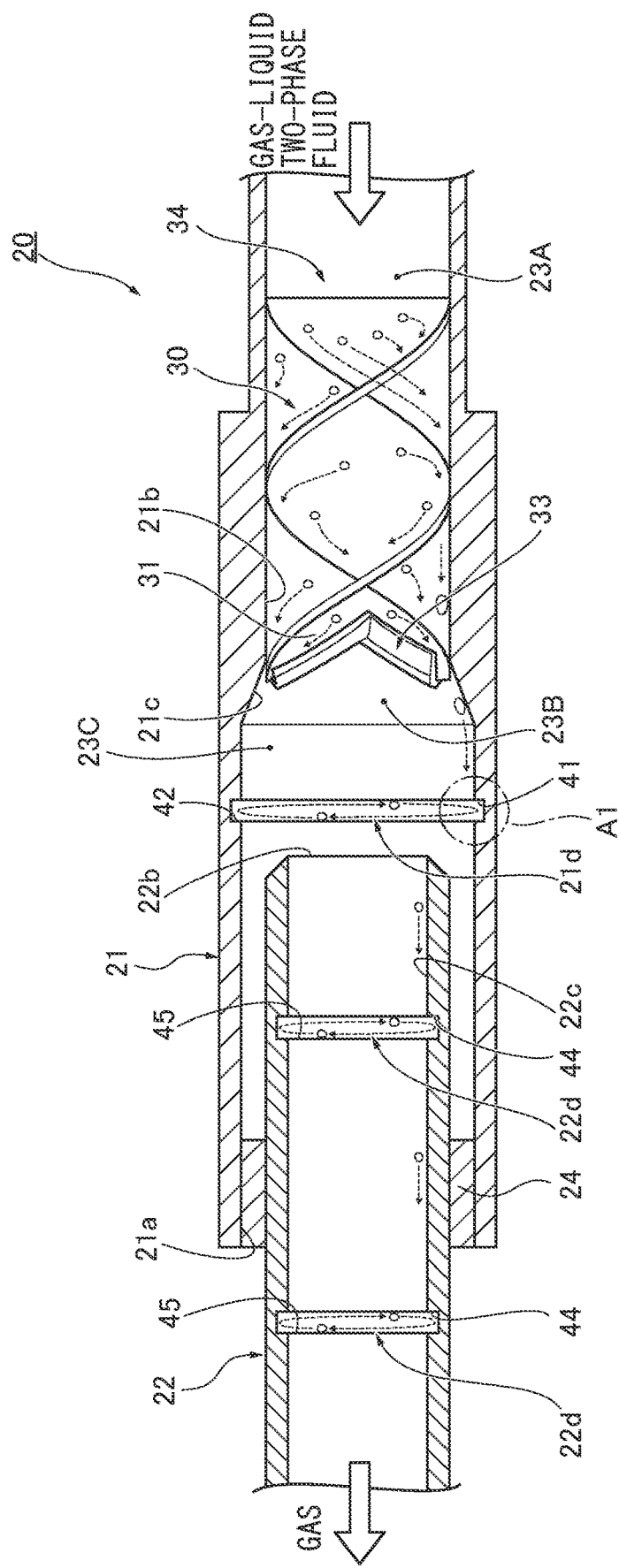
FIG. 8 is an overall explanatory diagram illustrating a flow of a gas-liquid two-phase fluid and flows of separated gas and liquid in the gas-liquid separator according to the First Embodiment.

FIG. 8 is an overall explanatory diagram illustrating a flow of a gas-liquid two-phase fluid and flows of separated gas and liquid in the gas-liquid separator according to the First Embodiment.

In the exhaust gas recirculation system S shown in FIG. 1, an outside air taken from the intake port 2a and the exhaust gas taken from the exhaust passage 3 via the low-pressure EGR passage 11 flow into the compressor 5a of the turbocharger 5 at a flow rate of 10 m/s to 100 m/s. At this time, moisture is contained in the outside air and the exhaust gas. These gases (the outside air and the exhaust gas) are cooled in the EGR cooler 13 so that the moisture is condensed into particulate liquid as condensed water, and the liquid is mixed with the gas such as air to form the gas-liquid two-phase fluid.

In the gas-liquid separator 20 of the First Embodiment, as shown in FIG. 8, the flow of the gas-liquid two-phase fluid turns into a swirling flow when the gas-liquid two-phase fluid in the inlet pipe 21 flows through the first area 23A along the swirling flow generating ribbon 30. Then, the centrifugal force is generated by the swirling flow, and the liquid having larger weight (mass) is guided toward the inner surface 21b of the inlet pipe 21 by the centrifugal force.

Then, the liquid guided toward the inner surface 21b coheres to become droplets and is separated from the gas. The liquid separated from the gas (hereinafter, referred to as droplets) flows from the second area 23B to the third area 23C by the swirling flow while the separated liquid is attached to the inner surface 21b.

On the other hand, the inner surface 21b of the inlet pipe 21 in the third area 23C is provided with the circular groove 21d. The liquid reached the third area 23C by the swirling flow flows in the circular groove 21d together with the swirling gas while the liquid is attached to the inner surface 21b.

Figure 9:
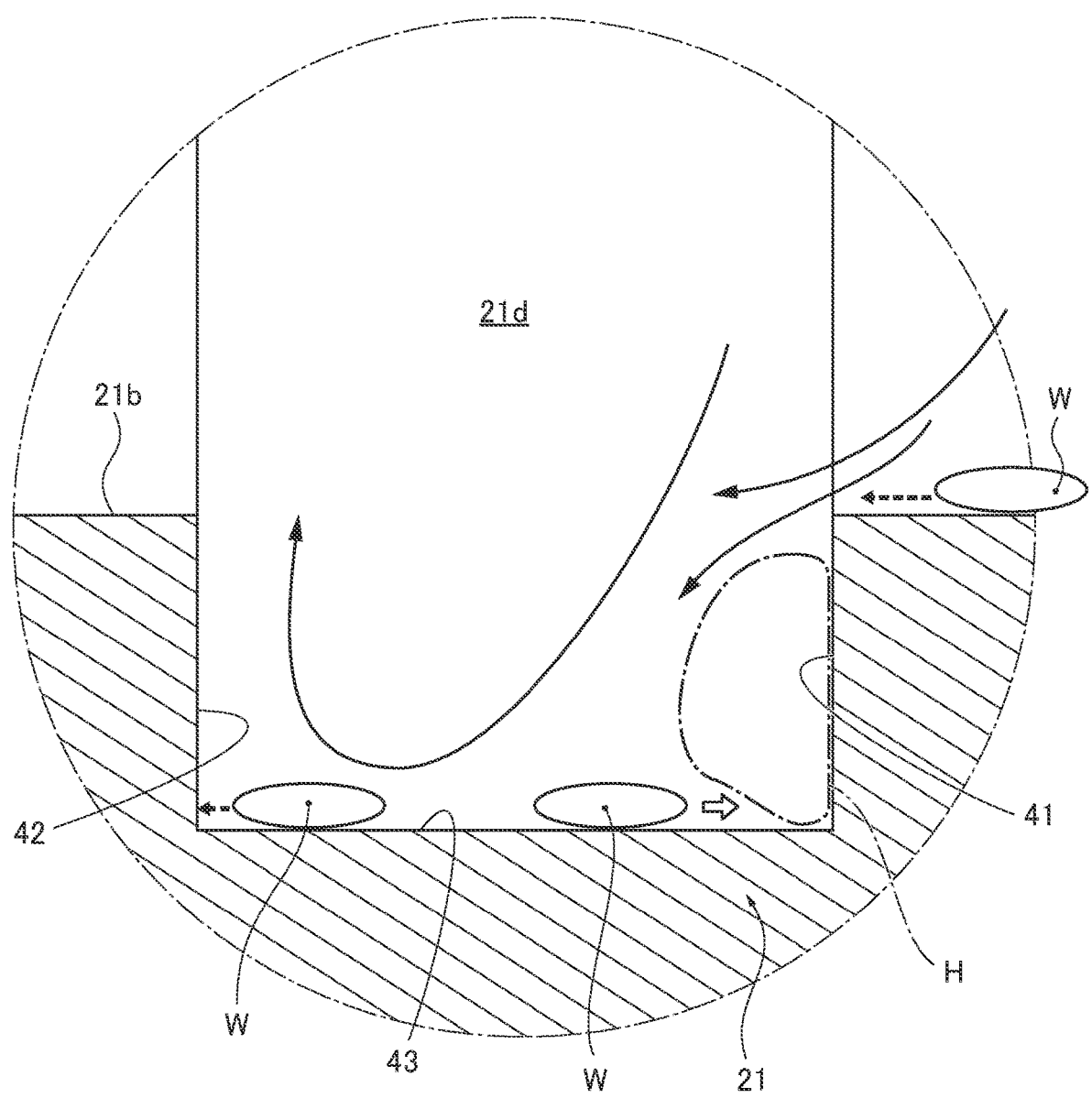
FIG. 9 is an enlarged view of an A1 portion illustrated in FIG. 8.

At this time, as shown in FIG. 9, the gas flowing into the circular groove 21d generates a turbulent flow within the circular groove 21d and a negative pressure region H of low pressure is generated along the first step surface 41 upstream of the flow direction of the gas-liquid two-phase fluid. Accordingly, the droplets W flown into the circular groove 21d with the gas are pulled by the negative pressure region H to be drawn to the first step surface 41. Thereby, the droplets W stay within the circular groove 21d, specifically in the vicinity of the first step surface 41.

The bottom surface 43 of the circular groove 21d extends in the circumferential direction of the inlet pipe 21. Accordingly, the swirling gas circumferentially flows within the circular groove 21d along the bottom surface 43. In addition, the droplets W staying within the circular groove 21d also flows within the circular groove 21d along the bottom surface 43 together with the swirling gas. In other words, the gas and the droplets W swirl along the bottom surface 43 within the circular groove 21d. Then, the droplets W keep swirling along the bottom surface 43 and evaporate.

Accordingly, the liquid separated from the gas (droplets W) swirls within the circular groove 21d while pulled to the first step surface 41 and evaporates. The droplets W thus do not flow downward in the flow direction of the gas-liquid two-phase fluid. It is possible to prevent the droplets W from flowing into the inner pipe 22 with the gas. It also becomes unnecessary to discharge the droplets W outside the inlet pipe 21 to be collected, which prevents the size of the gas-liquid separator from increasing.

In the gas-liquid separator 20 of the First Embodiment, the inner surface 22c of the inner pipe 22 includes a plurality of circular grooves 22d (two grooves in this embodiment). Accordingly, even if the liquid which is not separated from the gas and the droplets which are not evaporated flow in the inner pipe 22 through the opening 22b with the gas, the liquid and the droplets are guided to the inner surface 22c by the gas flowing through the inner pipe 22 and cohere. The liquid flows into the circular grooves 22d if the liquid in the form of droplets flows while attached to the inner surface 22c. The droplets flown into the circular grooves 22d, similar to the droplets in the inlet pipe 21, are pulled by the negative pressure region generated along the first step surface 44 of the circular groove 22d, and stay within the circular groove 22d. The droplets W staying within the circular groove 22d circumferentially flow along the bottom surface 46 together with the swirling gas, and swirl in the circular groove 22d along the bottom surface 46. Then, the droplets keep swirling along the bottom surface 46 and evaporate. As a result, in the gas-liquid separator 20, it is possible to prevent the liquid in the form of droplets from flowing downstream of the gas-liquid two-phase fluid from the circular groove 22d.

In the gas-liquid separator 20 of the First Embodiment, the inner pipe 22 is provided with the circular groove 22d having the first step surface 44. The droplets thereby stay near the first step surface 44 of the circular groove 22d and gradually evaporate even if the liquid in the form of droplets flows in the inner pipe 22 with the gas. Accordingly, it becomes unnecessary to collect the liquid in the form of droplets, and it becomes possible to prevent the size of the gas-liquid separator from increasing. It also becomes possible to prevent the droplets from flowing in the inner pipe 22 with the gas.

(Droplet Retention Action of Second Step Surface)

In the gas-liquid separator 20 of the First Embodiment, the circular groove 21d provided in the inlet pipe 21 and the circular groove 22d provided in the inner pipe 22 include the second step surfaces 42, 45 at the location downstream of the flow direction of the gas-liquid two-phase fluid from the first step surfaces 41, 44. The second step surfaces 42, 45 gradually decrease the inner diameter of each pipe 21, 22 downstream thereof.

Thereby, as illustrated in FIG. 9, even if the droplets W flown in the circular groove 21d move downward by the swirling flow and leave from the first step surface 41, the second step surface 42 prevents the movement of the droplets W, and the droplets W stay in the circular groove 21d. Accordingly, in the gas-liquid separator 20 of the First Embodiment, the second step surface 42 prevents the droplets W from flowing downward from the circular groove 21d. In the gas-liquid separator 20, the droplets W stay within the circular groove 21d and evaporate, which can prevents the liquid in the form of droplets W from flowing downward.

In the gas-liquid separator 20 of the First Embodiment, similar to the droplets in the second step surface 42, even if the droplets flown into the circular groove 22d move downward by the swirling flow and leave from the first step surface 44, the movement of the droplets is prevented by the second step surface 45 and the droplets stays within the circular groove 22d. Accordingly, the second step surface 45 prevents the droplets W from flowing downward from the circular groove 22d. The droplets W thereby stay within the circular groove 22d and evaporate, which suppresses the liquid in the form of droplets from flowing downward.

(Other Characteristic Action)

In the gas-liquid separator 20 of the First Embodiment, as shown in FIG. 8, the inner surface 21b of the inlet pipe 21 includes the circular groove 21d having the first step surface 41 and the second step surface 42, and the inner surface 22c of the inner pipe 22 includes the circular groove 22d having the first step surface 44 and the second step surface 45. That is, the first step surfaces 41, 44 are formed in both of the inlet pipe 21 and the inner pipe 22, respectively.

In the gas-liquid separator 20, the liquid separated from the gas by swirling the gas-liquid two-phase fluid stays in the vicinity of the first step surface 41 of the circular groove 21d within the inlet pipe 21 and evaporates. On the other hand, when the liquid which is not separated from the gas and the droplets which are not evaporated flow in the inner pipe 22, the liquid and the droplets stay in the vicinity of the first step surface 44 of the circular groove 22d formed in the inner pipe 22 and evaporate.

In the gas-liquid separator 20 of the First Embodiment, the liquid in the form of droplets evaporates in two positions in the inlet pipe 21 and the inner pipe 22, the liquid in the form of droplets is further prevented from flowing downward with the gas, and the vaporizing rate of the droplet can be improved.

Now, effects will be described. According to the gas-liquid separator 20 in the First Embodiment, the following effects are obtained.

(1) A gas-liquid separator 20 comprises: a pipe (inlet pipe 21) through which a gas-liquid two-phase fluid flows; and a swirling flow generator (swirling flow generating ribbon 30) disposed within the pipe (inlet pipe 21) to swirl the gas-liquid two-phase fluid along an inner surface 21b of the pipe (inlet pipe 21), wherein the inner surface 21b of the pipe (inlet pipe 21) includes a first step surface 41 at a location downstream of a flow direction of the gas-liquid two-phase fluid from the swirling flow generator (swirling flow generating ribbon 30), the first step surface 41 increasing an inner diameter of the pipe (inlet pipe 21) downward thereof. Thereby, it is possible to prevent the liquid in the form of droplets from flowing with the gas when the gas and the liquid are separated by swirling the gas-liquid two-phase fluid while suppressing the increase in the size of the gas-liquid separator.

(2) The inner surface 21b of the pipe (inlet pipe 21) includes a second step surface 42 at a location downstream of the gas-liquid two-phase fluid from the first step surface 41, the second step surface 42 decreasing the inner diameter of the pipe (inlet pipe 21) downward thereof. Thereby, in addition to the effect (1), it is possible to prevent the liquid in the form of droplets from flowing downstream from the vicinity of the first step surface 41 and to suppress the liquid not to flow downstream as the droplets.

(3) The pipe comprises: an inlet pipe 21 within which the swirling flow generator (swirling flow generating ribbon 30) is disposed, the inlet pipe 21 including an exhaust port 21a at a location downstream of the gas-liquid two-phase fluid from the swirling flow generator (swirling flow generating ribbon 30); and an inner pipe 22 including an end inserted into the exhaust port 21a and an opening 22b that is open at a location downstream of the flow direction of the gas-liquid two-phase fluid from the swirling flow generator (swirling flow generating ribbon 30), and both of the inner surface 21b of the inlet pipe 21 and the inner surface 22c of the inner pipe 22 include the first step surfaces 41, 44, respectively. Thereby, in addition to the effect (1) or the effect (2), it is possible to evaporate the liquid within both of the inlet pipe 21 and the inner pipe 22, and prevent the liquid in the form of droplets from flowing downward.

Second Embodiment

In a gas-liquid separator according to the Second Embodiment, an inner pipe inserted into an inlet pipe includes in an outer surface a protrusion that circumferentially extends and a heater.

Figure 10:
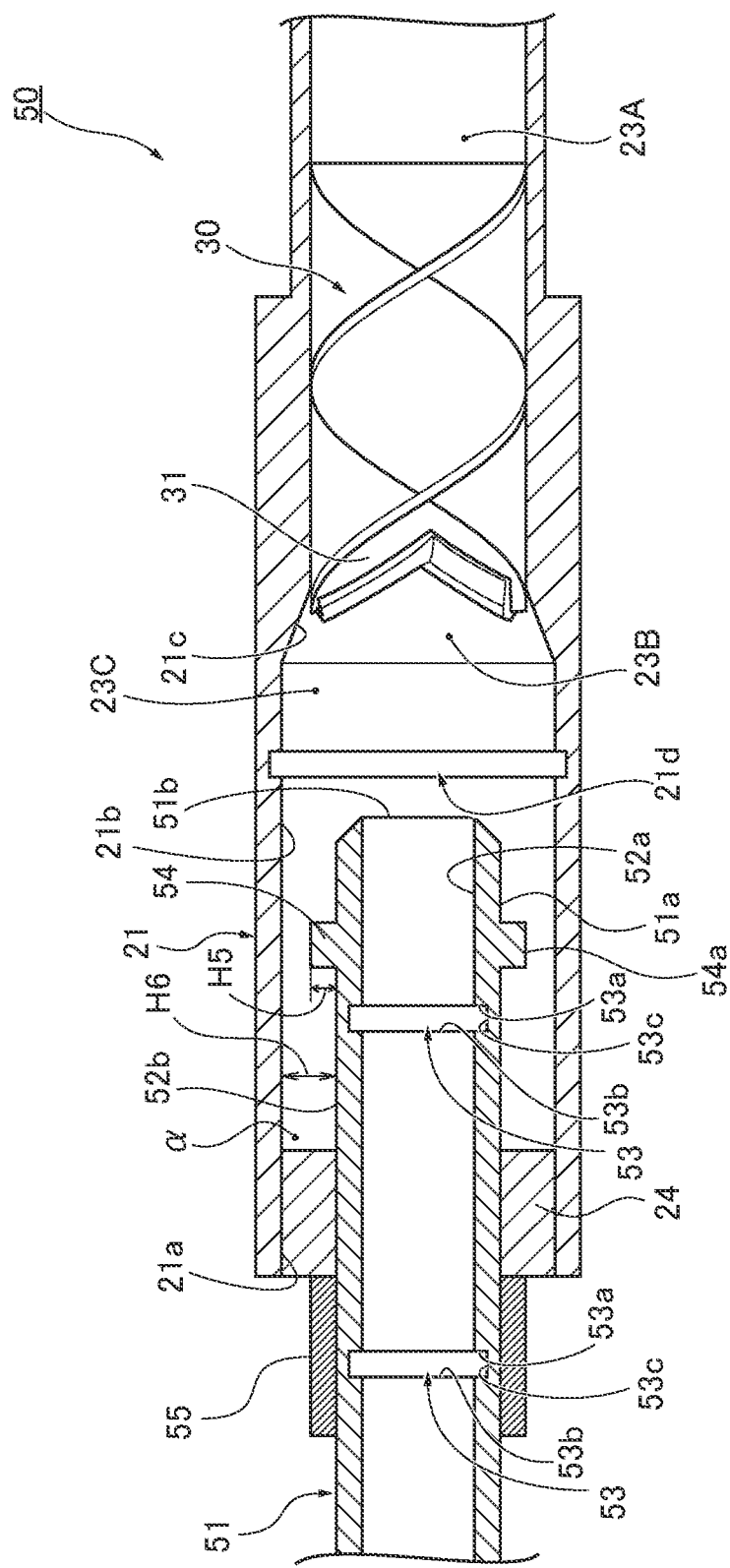
FIG. 10 is a cross sectional view illustrating a gas-liquid separator according to a Second Embodiment.

First, the configuration of the gas-liquid separator of the Second Embodiment will be described. FIG. 10 is a cross sectional view illustrating the gas-liquid separator according to the Second Embodiment. Hereinafter, the configuration of the gas-liquid separator according to the Second Embodiment will be described with reference to FIG. 10. In addition, the same reference numbers as the First Embodiment are applied to the similar configurations of the First Embodiment, and the detailed description thereof will be omitted.

As shown in FIG. 10, the gas-liquid separator 50 in the Second Embodiment includes an inlet pipe 21, an inner pipe 51, and a swirling flow generating ribbon 30 (swirling flow generator). A gas-liquid two-phase fluid flows in the inlet pipe 21. An end 51*a* of the inner pipe 51 is inserted into an exhaust port 21*a* of the inlet pipe 21, and the swirling flow generating ribbon 30 is disposed within the inlet pipe 21.

The inner pipe 51 is a straight pipe which has an outer diameter smaller than the minimum inner diameter of the inlet pipe 21 at the third area 23C. The inner pipe 51 is disposed coaxially with the inlet pipe 21. A gap or a clearance α is thereby formed between the outer surface 52*b* of the inner pipe 51 and the inner surface 21*b* of the inlet pipe 21. The end 51*a* of the inner pipe 51 inserted into the inlet pipe 21 includes an opening 51*b* that is open in the axial direction of the inner pipe 51 at a location downstream of the flow direction of the gas-liquid two-phase fluid from the swirling flow generating ribbon 30. Further, a downstream end (left side in FIG. 13) of the inner pipe 51 is in communication with a not shown compressor of a turbocharger.

An inner surface 52*a* of the inner pipe 51 includes a plurality of circular grooves 53 (two grooves in this embodiment). Each of the circular grooves 53 circumferentially extends along the inner pipe 51. Each circular groove 53 includes a first step surface 53*a*, a second step surface 53*b*, and a bottom surface 53*c*, and has the similar configurations as the circular groove 22*d* in the First Embodiment. The detailed description thereof thus will be omitted.

An outer surface 52*b* of the inner pipe 51 includes a protrusion 54 formed in the portion inserted into the inlet pipe 21. Further, an electrical heating sheet (heater) 55 is provided around a portion of the inner pipe 51 extending from the inlet pipe 21.

The protrusion 54 radially extends from the outer surface 52*b* and circumferentially extends along the inner pipe 51 to entirely surround the outer surface 52*b*. The protrusion 54 is formed between the opening 51*b* that is open at the end 51*a* of the inner pipe 51 and the spacer 24 fitted into the exhaust port 21*a* of the inlet pipe 21. A height H5 of the protrusion 54 is set to be smaller than a height H6 of a clearance between the inner surface 21*b* of the inlet pipe 21 and the outer surface 52*b* of the inner pipe 51. Thereby, a gap or clearance is formed between a tip surface 54*a* of the protrusion 54 and the inner surface 21*b* of the inlet pipe 21.

The electrical heating sheet 55 is a flexible sheet including heating wires which generate heat by turning on a switch (not shown), and is wrapped around the inner pipe 51 to cover the outer surface 52*b*. The outer surface 52*b* of the inner pipe 51 is heated when the heating wires of the electrical heating sheet 55 generates heat. In the Second Embodiment, one of the circular grooves 53 formed in the inner pipe 51 is formed on the inner surface 52*a* of the portion inserted into the inlet pipe 21, and the other of the circular grooves 53 is formed on the inner surface 52*a* of the portion extending from the inlet pipe 21. Accordingly, the electrical heating sheet 55 heats a portion of the outer surface 52*b* in which the circular grooves 53 (the first step surface 53*a*) is formed.

Figure 11:
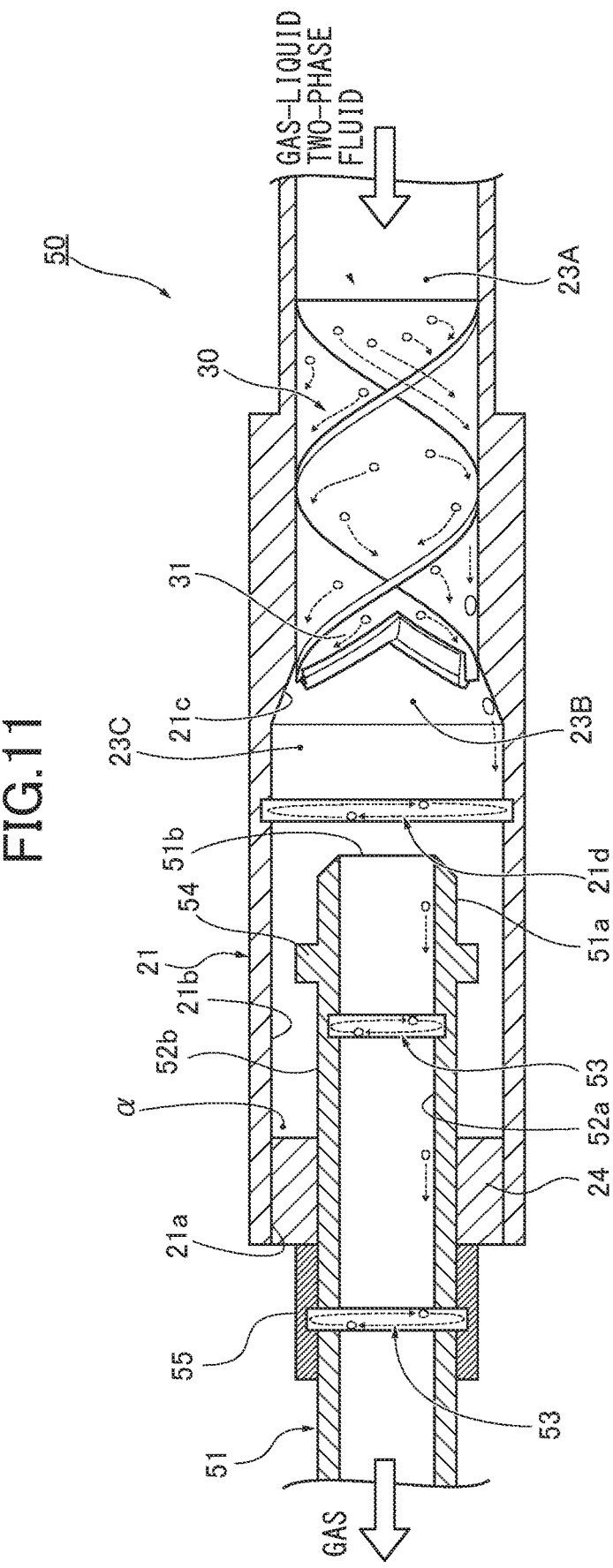
FIG. 11 is an overall explanatory diagram illustrating the flow of the gas-liquid two-phase fluid and the flow of the separated gas and liquid in the gas-liquid separator according to the Second Embodiment.

Next, the operation will be described. FIG. 11 is an overall explanatory diagram illustrating the flow of the gas-liquid two-phase fluid and the flow of the separated gas and liquid in the gas-liquid separator according to the Second Embodiment. Hereinafter, the operation of the Second Embodiment will be described with reference to FIG. 11.

In the gas-liquid separator 50 of the Second Embodiment, as shown in FIG. 11, the gas-liquid two-phase fluid through the inlet pipe 21 swirls while flowing along the swirling flow generating ribbon 30 so that the liquid is guided to the inner surface 21*b* of the inlet pipe 21 and coheres to become droplets. The liquid in the form of droplets flows from the second area 23B to the third area 23C by the swirling flow while the liquid in the form of droplets is attached to the inner surface 21*b*.

The droplets flown to the third area 23C flow in the circular groove 21*d* formed in the inner surface 21*b* of the inlet pipe 21, and stay within the circular groove 21*d* and keep swirling. As a result, the droplets evaporate.

Figure 12:
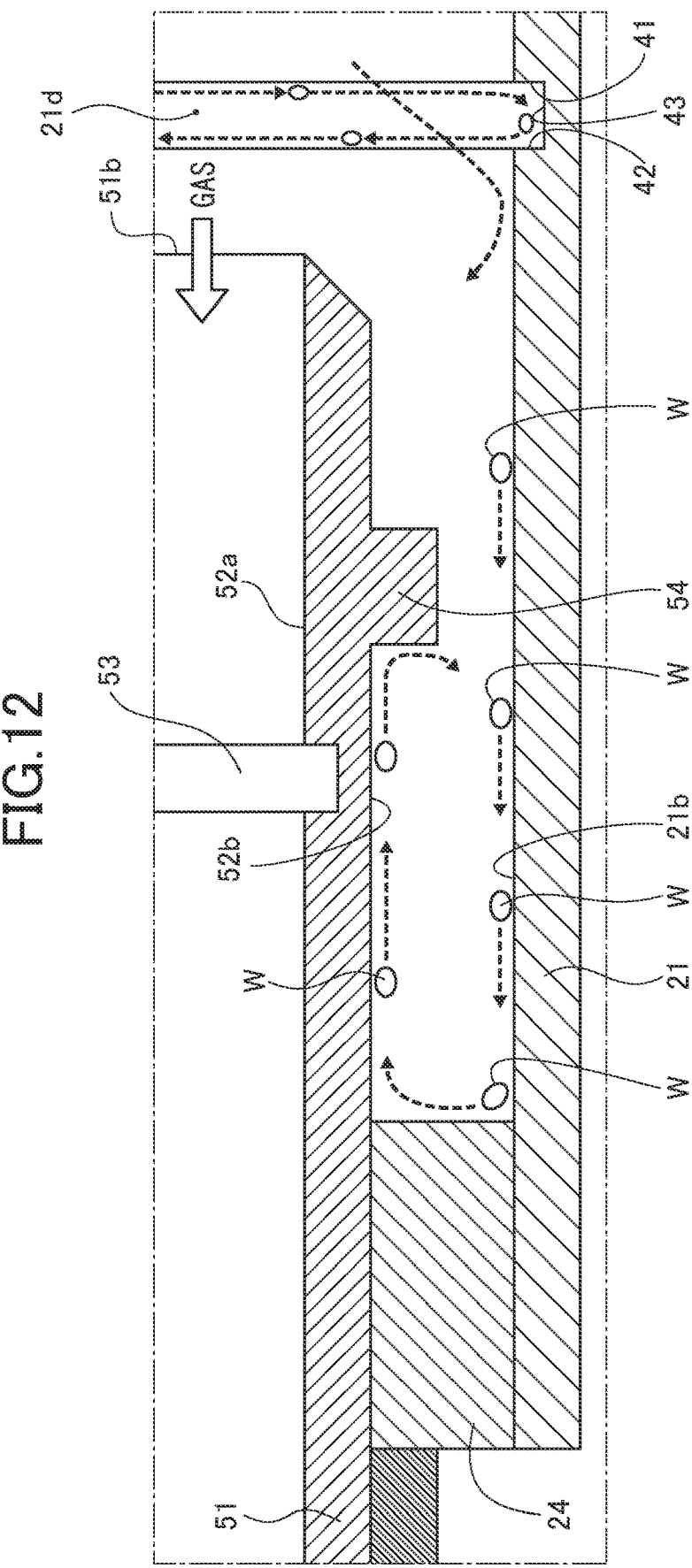
FIG. 12 is an enlarged view illustrating the flow of the liquid in the gas-liquid separator according to the Second Embodiment.

However, it is difficult to evaporate all droplets within the circular groove 21*d*. A part of the liquid turned to the droplets does not flow in the circular groove 21*d*, and may flow downward with the gas. As shown in FIG. 12, the droplets W flown downward from the circular groove 21*d* flow between the inlet pipe 21 and the inner pipe 51.

The gas which is not flown in the inner pipe 51 flows between the inlet pipe 21 and the inner pipe 51. However, the flow of the gas between the inlet pipe 21 and the inner pipe 51 is blocked by the spacer 24. Accordingly, the swirling flow of the gas along the inner surface 21*b* of the inlet pipe 21 collides with the spacer 24 and then flows backward along the outer surface 52*b* of the inner pipe 51 toward the opening 51*b* of the inner pipe 51.

Thereby, after the droplets W flown downward from the circular groove 21*d* and flown between the inlet pipe 21 and the inner pipe 51 flow along the inner surface 21*b* of the inlet pipe 21 by the flow of the gas, the droplets W collide with the spacer 24 and flow toward the opening 51*b* along the outer surface 52*b* of the inner pipe 51.

On the other hand, in the gas-liquid separator 50 of the Second Embodiment, a portion of the outer surface 52*b* of the inner pipe 51 inserted into the inlet pipe 21 includes the protrusion 54.

Therefore, the protrusion 54 blocks the flow of droplets W which is forced to move toward the opening 51*b* along the outer surface 52*b* of the inner pipe 51 after colliding with the spacer 24. The droplets W blocked by the protrusion 54 is prevented from flowing in the inner pipe 51 through the opening 51*b*. In the gas-liquid separator 50, the droplets flown downward from the circular groove 21*d* and flown between the inlet pipe 21 and the inner pipe 51 can be prevented from flowing in the inner pipe 51, and can be prevented from mixing the liquid in the form of droplets with the gas flowing in the inner pipe 51.

Further, in the gas-liquid separator 50 in the Second Embodiment, as shown in FIG. 11, the electrical heating sheet 55 covers the outer surface 52*b* of the portion of the inner pipe 51 extending from the inlet pipe 21. Therefore, in the gas-liquid separator 50, the outer surface 52*b* of the inner pipe 51 can be heated by the electrical heating sheet 55 which is turned on to generate heat.

Thereby, it is possible to increase the temperature in the portion of the inner pipe 51 extending from the inlet pipe 21 and to facilitate the evaporation of the liquid flown into the inner pipe 51 with the gas. As a result, it is possible to evaporate and vaporize the droplets flown into the inner pipe 51, to prevent the liquid in the form of droplets from flowing downstream with the gas, and to improve the vaporizing rate of the droplets.

In the gas-liquid separator 50 of the Second Embodiment, the circular groove 53 including the first step surface 53*a* is formed on the portion of the inner surface 52*a* of the inner pipe 51 extending from the inlet pipe 21 and covered by the electrical heating sheet 55. Therefore, the outer surface 52*b* of the portion of the inner pipe 51 provided with the circular groove 53 is heated by the electrical heating sheet 55.

Therefore, it is possible to facilitate the evaporation of the droplets staying in the vicinity of the first step surface 53*a* of the circular groove 53 and to effectively evaporate the droplets flown into the inner pipe 51, and to improve the removal rate of the droplets.

Now, effects will be described. According to the gas-liquid separator 50 in the Second Embodiment, the following effects are obtained.

(4) An outer surface 52b of the inner pipe 51 and the inner surface 21b of the inlet pipe 21 include therebetween a gap or clearance α, and the inner pipe 51 includes a protrusion 54 on the outer surface 52b of a portion of the inner pipe 51 inserted into the inlet pipe 21, the protrusion 54 circumferentially extending. Thereby, in addition to the above effect (3), it is possible to prevent the droplets which are not evaporated in the inlet pipe 21 from mixing with the gas flowing through the inner pipe 51.

(5) The pipe (inner pipe 51) includes a heater (electrical heating sheet 55) that heats the outer surface 52b. Thereby, in addition to any one of the above effects (1) to (4), it is possible to facilitate the vaporization of the liquid and to improve the vaporizing rate of the droplets.

(6) The heater (electrical heating sheet 55) heats the outer surface 52b of the portion of the pipe (inner pipe 51) including the first step surface 53a. Thereby, in addition to the above effect (5), it is possible to facilitate the vaporization of the droplets staying in the vicinity of the first step surface 53a, and effectively evaporate the droplets.

Although the gas-liquid separator of the present disclosure has been described based on the First Embodiment and the Second Embodiment, the specific configurations are not limited to these embodiments, and modifications and/or additions of the configurations may be made without departing from the gist of the invention recited in the claims.

Figure 13B:
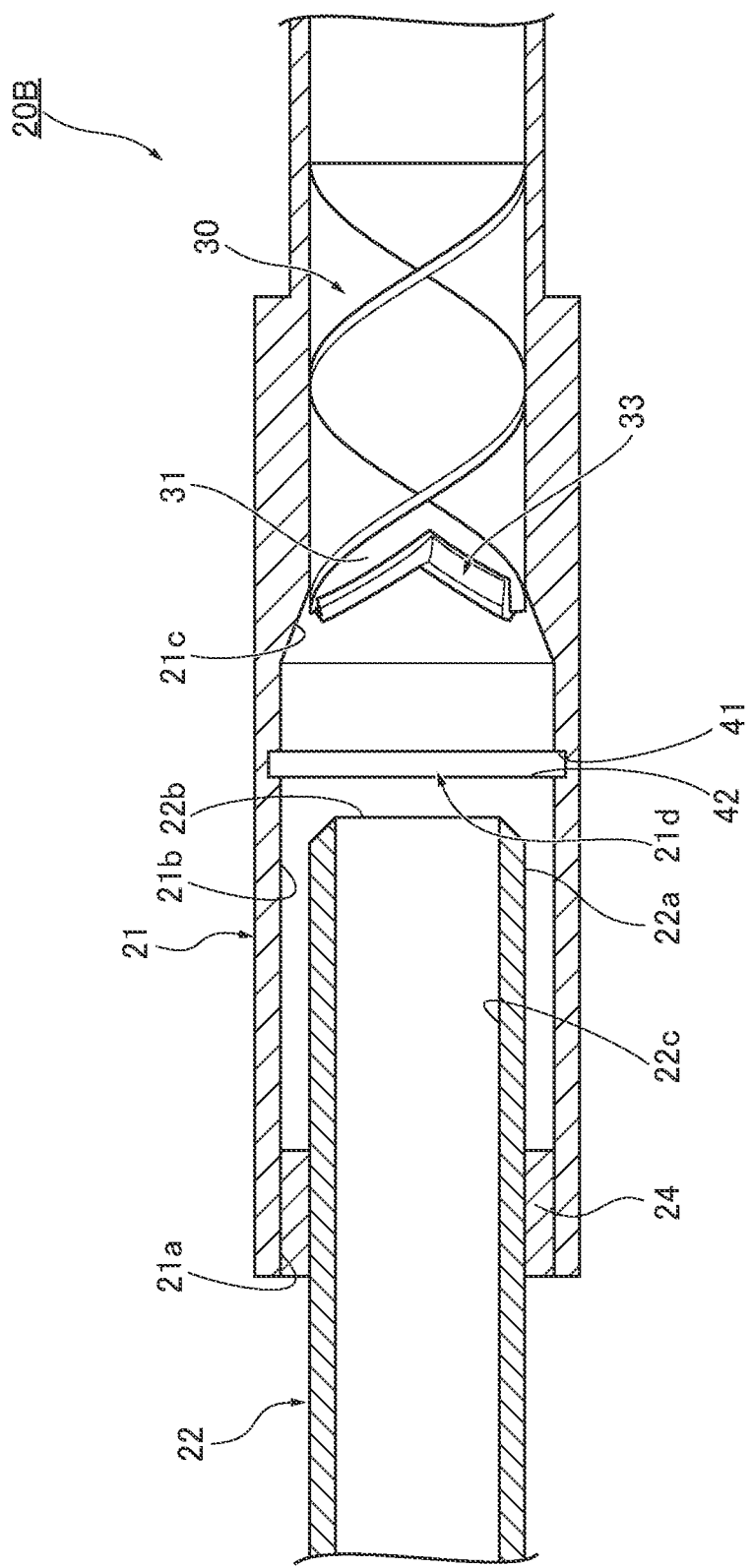
FIG. 13B is a cross sectional view illustrating a second variation of the gas-liquid separator according to the First Embodiment.

In the gas-liquid separator 20 of the First Embodiment, the inlet pipe 21 includes the circular groove 21d having the first step surface 41 and the inner pipe 22 includes the circular groove 22d having the first step surface 44. However, the gas-liquid separator 20 is not limited to the above. For example, a gas-liquid separator 20A shown in FIG. 13A may be adopted. In the gas-liquid separator 20A shown in FIG. 13A, the inner surface 21b of the inlet pipe 21 does not include the circular groove and the inner surface 22c of the inner pipe 22 only includes the circular groove 22d having the first step surface 44. A gas-liquid separator 20B as shown in FIG. 13B may be adopted. In the gas-liquid separator 20B shown in FIG. 13B, the inner surface 21b of the inlet pipe 21 only includes the circular groove 21d having the first step surface 41 and the inner surface 22c of the inner pipe 22 does not include the circular groove. That is, as long as at least one of the inner surfaces 21b, 22c of the inlet pipe 21 and the inner pipe 22 includes the first step surface, it is possible to stay the liquid separated from the gas-liquid two-phase fluid in the vicinity of the first step surface and to evaporate. As a result, it is possible to prevent the liquid in the form of droplets from flowing downstream.

Figure 13C:
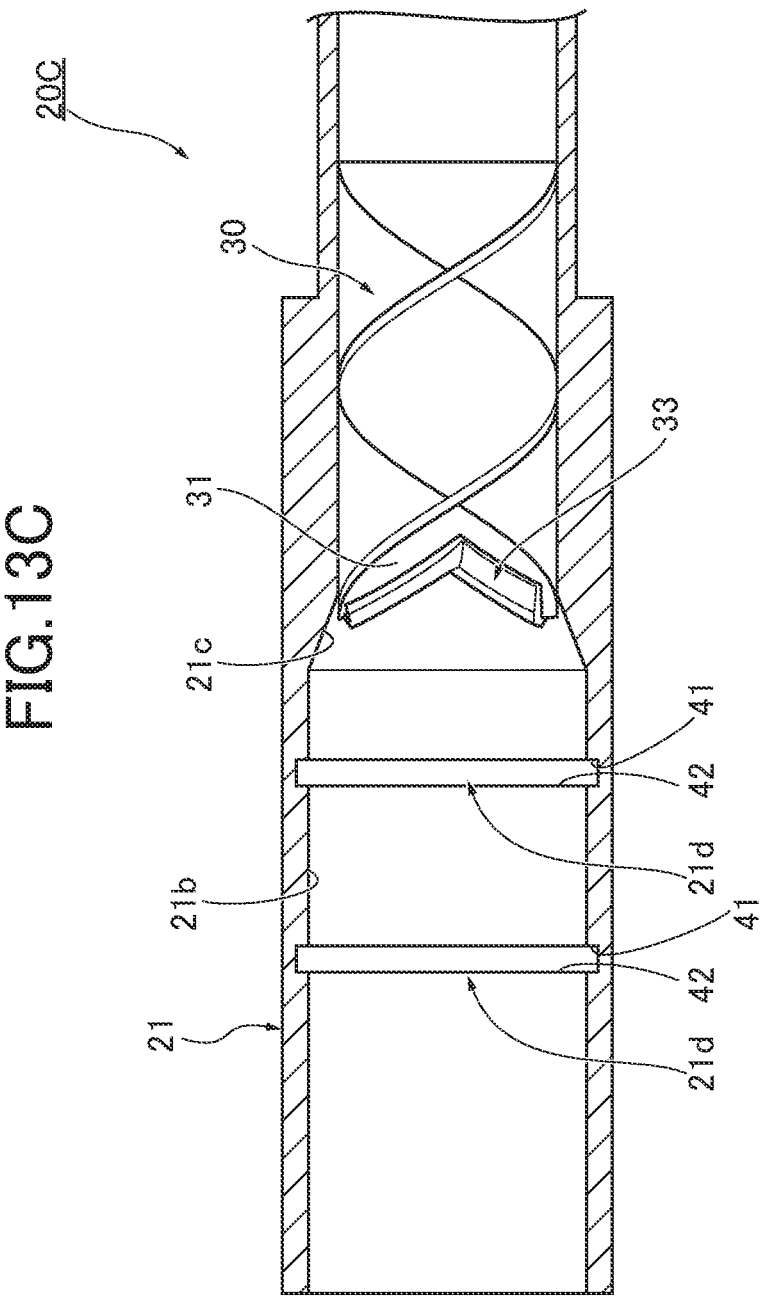
FIG. 13C is a cross sectional view illustrating a third variation of the gas-liquid separator according to the First Embodiment.
Figure 13D:
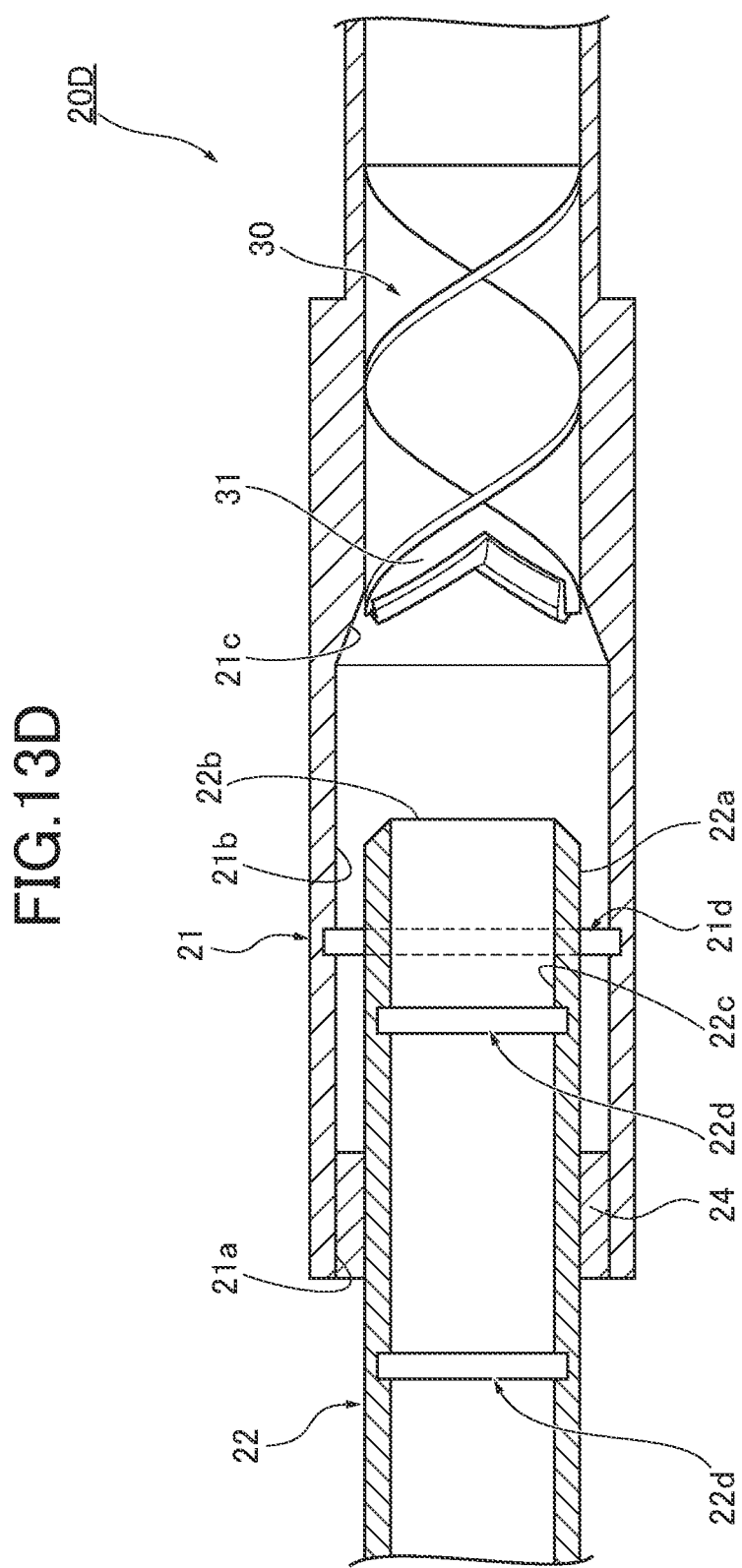
FIG. 13D is a cross sectional view illustrating a fourth variation of the gas-liquid separator according to the First Embodiment.

Further, when the inner surface 21b of the inlet pipe 21 only includes the circular groove 21d having the first step surface 41, as a gas-liquid separator 20C shown in FIG. 13C, it is not necessary to provide the inner pipe. In this case, the gas-liquid separator 20C does not have an exhaust port into which the inner pipe is inserted, and the end of the inlet pipe 21 connected to the turbocharger (not shown) corresponds to the exhaust port.

In addition, in the gas-liquid separator 20 of the First Embodiment, the circular groove 21d formed in the inlet pipe 21 is formed at the location downstream of the swirling flow generating ribbon 30 and upstream of the opening 22b of the inner pipe 22. However, as a gas-liquid separator 20D shown in FIG. 13D, the circular groove 21d may be formed at the location downstream of the opening 22b of the inner pipe 22, that is, at the location surrounding the inner pipe 22. In this case, as the droplets are evaporated downstream of the opening 22b of the inner pipe 22, it is possible to prevent the droplets downsized during the evaporation from flowing in the inner pipe 22 even if the downsized droplets are scattered by the force of the gas.

In the gas-liquid separator 20 of the First Embodiment, the circular groove 21d formed in the inner surface 21b of the inlet pipe 21 includes the first step surface 41 and the second step surface 42, and the circular groove 22d formed in the inner surface 22c of the inner pipe 22 includes the first step surface 44 and the second step surface 45. However, the gas-liquid separator 20 is not limited to the above. A gas-liquid separator 20E shown in FIG. 14 may be adopted. In the gas-liquid separator 20E, a first step surface 41A which increases the inner diameter downward thereof is only formed in the inner surface 21b of the inlet pipe 21 at the location downward in the flow direction of the gas-liquid two-phase fluid from the swirling flow generating ribbon 30. In this case, the negative pressure area is generated along the first step surface 41A, and the liquid in the form of droplets stays in the vicinity of the first step surface 41A and circumferentially swirls. As a result, the liquid in the form of droplets evaporates.

Further, a plurality of first step surfaces may be formed in the inner surfaces 21b, 22c of the inlet pipe 21 and the inner pipe 22 along the flow direction of the gas-liquid two-phase fluid. Specifically, the inner diameter of the pipe, for example, the inlet pipe 21 may intermittently become lager at a plurality of locations. In this case, it is possible to stay the liquid in the form of droplets in the vicinity of each first step surface and to evaporate. As a result, it is possible to evaporate the droplets a plurality of times and to improve the vaporizing rate of the droplets.

Figure 15:
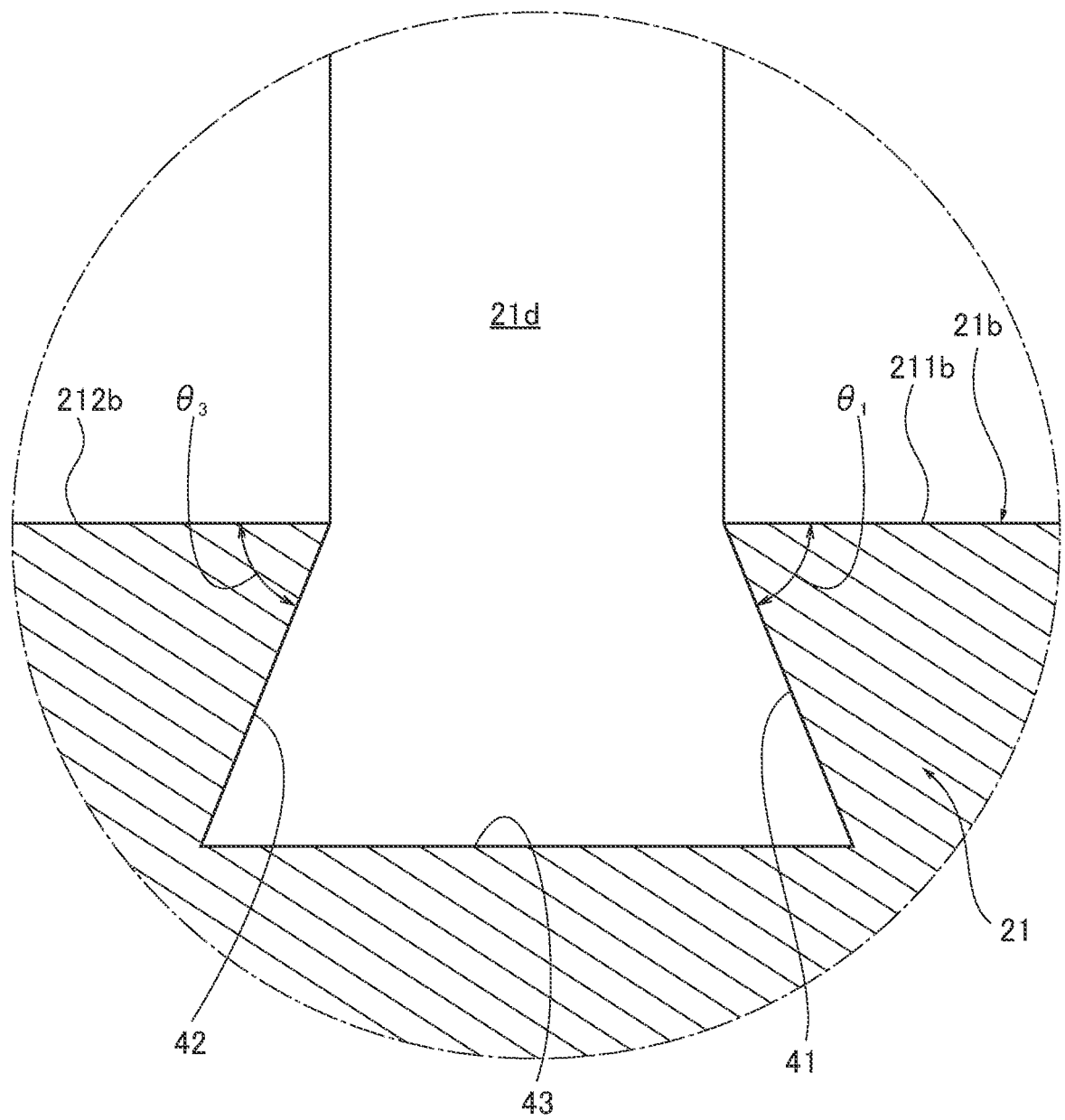
FIG. 15 is an enlarged cross sectional view illustrating a primary section of a sixth variation of the gas-liquid separator according to the First Embodiment.

Further, in the First Embodiment, the angle $\theta_1$ is defined by the first step surface 41 formed in the inlet pipe 21 and the inner surface 211b located upstream of the first step surface 41 and the angle $\theta_1$ is set to 90° (degrees), and also angle $\theta_3$ is defined by the first step surface 44 formed in the inner pipe 22 and the inner surface 221c located upstream of the first step surface 44 and the angle $\theta_3$ is set to 90° (degrees). However, the angle $\theta_1$ and the angle $\theta_3$ may be set to any angle as long as the angle can generate the negative pressure region H along the first step surfaces 41, 44. Specifically, the angle $\theta_1$ and the angle $\theta_3$ may be an acute angle set to be equal to or lower than 90° (degrees) as shown in FIG. 15 (FIG. 15 only shows the circular groove 21d, but this angle is also adopted to the circular groove 22d).

Further, in the gas-liquid separator 20 of the First Embodiment, the angle $\theta_2$ is defined by the second step surface 42 formed in the inlet pipe 21 and the inner surface 212b located downstream of the second step surface 42, and the angle $\theta_2$ is set to 90° (degrees), and the angle $\theta_4$ is defined by the second step surface 45 formed in the inner pipe 22 and the inner surface 222c located downstream of the second step surface 45, and the angle $\theta_4$ is set to 90° (degrees). However, the angle $\theta_2$ and the angle $\theta_4$ may be set to any angle as long as the angle can prevent the droplets within the circular groove 21d, 22d from moving downstream along the second step surfaces 42, 45. Specifically, the angle $\theta_2$ and the angle $\theta_4$ may be an acute angle set to be equal to or lower than 90° (degrees) as shown in FIG. 15 (FIG. 15 only shows the circular groove 21d, but this angle is also adopted to the circular groove 22d).

Figure 16:
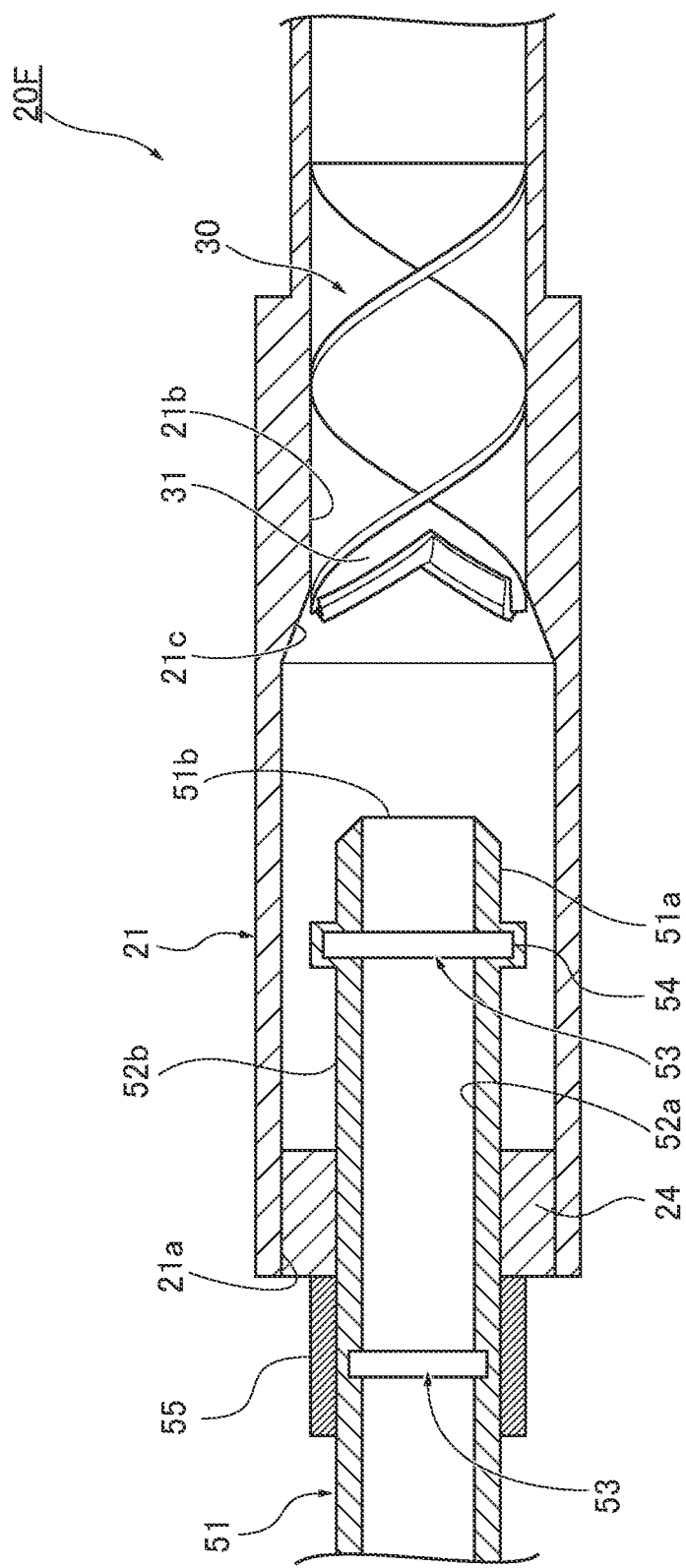
FIG. 16 is a cross sectional view illustrating a first variation of the gas-liquid separator according to the Second Embodiment.

Moreover, in the Second Embodiment, the axial position of the circular groove 53 formed on the inner surface 52a of the inner pipe 51 is not coincident with the axial position of the protrusion 54 formed on the outer surface 52b of the inner pipe 51. However, the axial positions are not limited to the above. For example, in a gas-liquid separator 20F shown in FIG. 16, the axial position of the circular groove 53 may be coincident with the axial position of the protrusion 54 by protruding a portion of the inner pipe 51 in which the inner surface 52a is recessed. In this case, it is possible to form the circular groove 53 and the protrusion 54 at the same time and to suppress the reduction of the wall thickness of the inner pipe 51 due to the formation of the circular groove 53.

Figure 17:
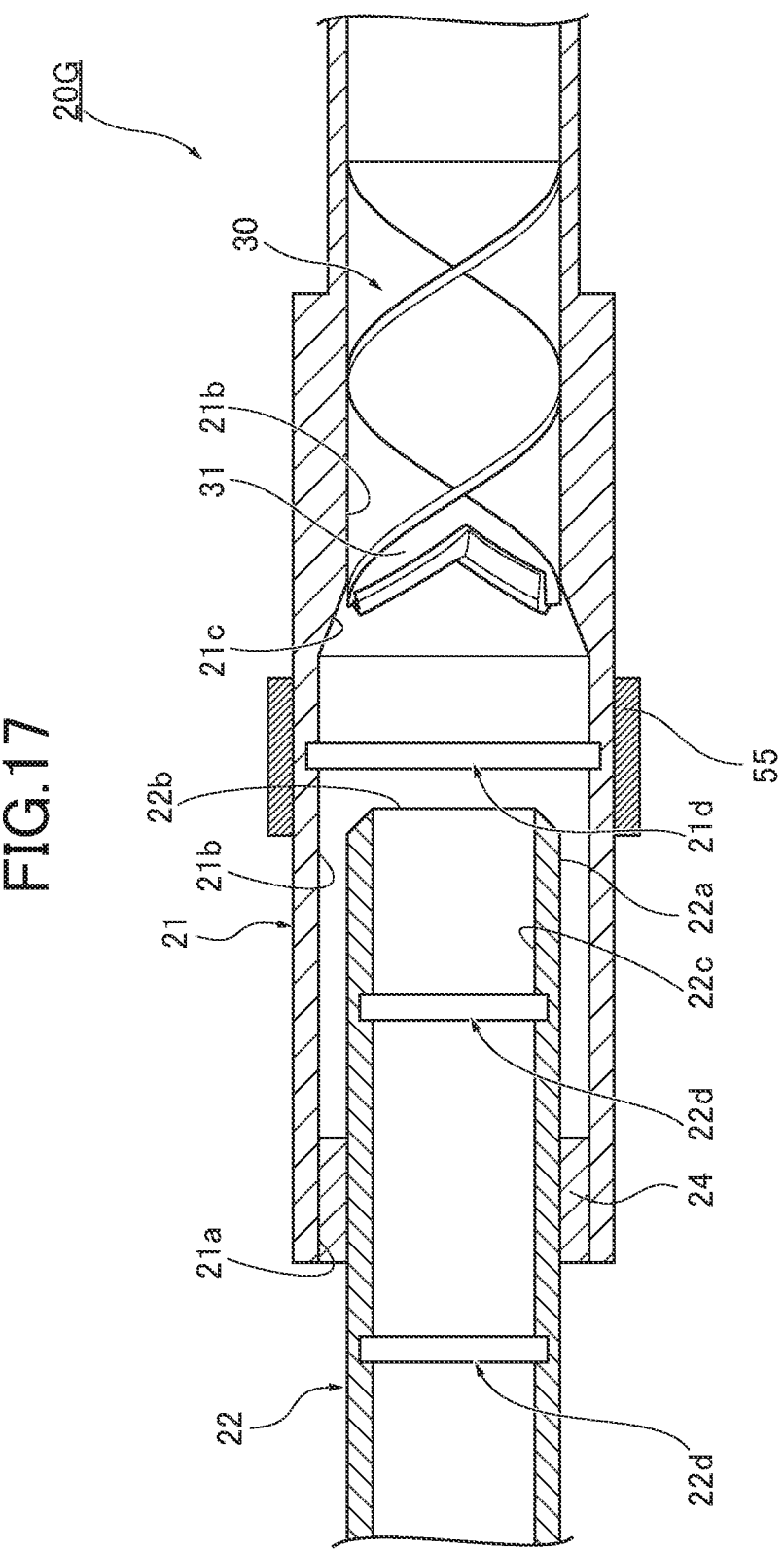
FIG. 17 is a cross sectional view illustrating a second variation of the gas-liquid separator according to the Second Embodiment.

In the Second Embodiment, the electrical heating sheet 55 is provided in the portion of the outer surface 52b of the inner pipe 51 projecting from the inlet pipe 21. However, the electrical heating sheet 55 is not limited thereto. As a gas-liquid separator 20G shown in FIG. 17, the electrical heating sheet 55 may cover the inlet pipe 21 and may heat the outer surface 21e of the inlet pipe 21. In this case, the temperature in the inlet pipe 21 increases, which facilitates the evaporation of the liquid contained in the gas-liquid two-phase fluid in the inlet pipe 21. The electrical heating sheet 55 may heat both of the outer surface 21e of the inlet pipe 21 and the portion of the outer surface 52b of the inner pipe 51 projecting from the inlet pipe 21.

Further, in the Second Embodiment, the electrical heating sheet 55, which is flexible, is used as the heater or heating means for heating the outer surface 52b of the inner pipe 51, but the heater is not limited to the above. A pipe to be heated, for example, the inlet pipe, may be formed in a double pipe structure to circulate high temperature exhaust gas between the two pipe walls to heat the pipe as long as the portion of the outer surface of the pipe such as the inlet pipe 21 and the inner pipe 51 can be heated. In other words, the double pipe structure using the circulation structure for the exhaust gas may be used as a heater.

In addition, the gas-liquid separator 20 of the First Embodiment is disposed at the location downstream of the low-pressure EGR valve 14 and upstream of the compressor 5a of the turbocharger 5 (i.e. at the location surrounded with a dashed line X in FIG. 1) in the exhaust gas recirculation system S. However, the location of the gas-liquid separator 20 is not limited to the above. The gas-liquid separator 20 may be disposed at a location where condensed water is produced in the exhaust gas recirculation system S. Accordingly, the gas-liquid separator 20 may be disposed at a location downstream of the intercooler 6 and upstream of the cylinder intake ports of the internal combustion engine 1 (i.e. at the location surrounded with a dashed line Y in FIG. 1).

Further, in the First Embodiment, the gas-liquid separator 20 is installed in a so-called transverse direction in which the flow direction of the gas-liquid two-phase fluid is horizontal with respect to the direction of gravity. However, the installation direction of the gas-liquid separator 20 in the present disclosure is not limited to the above, but may be appropriately selected considering factors such as a layout in the exhaust gas recirculation system S. Further, in the First Embodiment, the starting portion 34 extends in the direction of gravity. However, the extending direction of the starting portion 34 is not limited to the above, but may be appropriately selected considering factors such as the layout of the gas-liquid separator 20.

Moreover, in the First Embodiment, the internal combustion engine 1 is the diesel engine mounted in the vehicle. However, the internal combustion engine 1 is not limited to the diesel engine but may be a gasoline engine.

Further, in the First Embodiment and the Second Embodiment, the gas-liquid separators 20, 50 are applied to the exhaust gas recirculation system S of the internal combustion engine 1. However, the gas-liquid separators are not limited to the above but may be applied to a refrigeration cycle device, for example, to separate a gaseous refrigerant and a liquid refrigerant. In other words, the gas-liquid separator of the present disclosure can be applied to devices which separate the liquid and the gas from the gas-liquid two-phase fluid.

The invention claimed is:

1. A gas-liquid separator comprising:
a pipe through which a gas-liquid two-phase fluid flows; and
a swirling flow generator disposed within the pipe to swirl the gas-liquid two-phase fluid along an inner surface of the pipe, wherein
the inner surface of the pipe includes a first step surface at a location downstream of a flow direction of the gas-liquid two-phase fluid from the swirling flow generator, the first step surface increasing an inner diameter of the pipe downward thereof,
the pipe comprises an inlet pipe within which the swirling flow generator is disposed, the inlet pipe including an exhaust port at a location downstream of the flow direction of the gas-liquid two-phase fluid from the swirling flow generator and an inner pipe including an end inserted into the exhaust port and an opening that is open at a location downstream of the flow direction of the gas-liquid two-phase fluid from the swirling flow generator, and
both of the inner surface of the inlet pipe and the inner surface of the inner pipe include the first step surface.

2. The gas-liquid separator according to claim 1, wherein the inner surface of the pipe includes a second step surface at a location downstream of the flow direction of the gas-liquid two-phase fluid from the first step surface, the second step surface decreasing the inner diameter of the pipe downward thereof.

3. The gas-liquid separator according to claim 1, wherein an outer surface of the inner pipe and the inner surface of the inlet pipe include therebetween a gap, and
the inner pipe includes a protrusion on the outer surface of a portion of the inner pipe inserted into the inlet pipe, the protrusion circumferentially extending.

4. The gas-liquid separator according to claim 1, wherein the pipe includes a heater that heats the outer surface.

5. The gas-liquid separator according to claim 4, wherein the heater heats the outer surface of the portion of the pipe including the first step surface.

* * * * *